(12) United States Patent
Nongpiur et al.

(10) Patent No.: US 12,073,319 B2
(45) Date of Patent: Aug. 27, 2024

(54) SOUND MODEL LOCALIZATION WITHIN AN ENVIRONMENT

(71) Applicant: GOOGLE LLC, Mountain View, CA (US)

(72) Inventors: Rajeev Conrad Nongpiur, Mountain View, CA (US); Byungchul Kim, Los Altos, CA (US); Marie Vachovsky, San Francisco, CA (US); Monica Song, La Canada Flintridge, CA (US); Khe Chai Sim, Dublin, CA (US); Qian Zhang, Mountain View, CA (US)

(73) Assignee: Google LLC, Mountain View, CA (US)

( * ) Notice: Subject to any disclaimer, the term of this patent is extended or adjusted under 35 U.S.C. 154(b) by 821 days.

(21) Appl. No.: 16/940,294

(22) Filed: Jul. 27, 2020

(65) Prior Publication Data

US 2022/0027725 A1    Jan. 27, 2022

(51) Int. Cl.
*G06N 3/08* (2023.01)
*G06N 3/047* (2023.01)
*G10L 25/51* (2013.01)

(52) U.S. Cl.
CPC .............. *G06N 3/08* (2013.01); *G06N 3/047* (2023.01); *G10L 25/51* (2013.01)

(58) Field of Classification Search
CPC ......... G10L 25/51; G10L 25/78; G10L 15/26; G10L 15/20; G06N 3/08; G06N 7/01; G06N 20/10; G06V 10/40
See application file for complete search history.

(56) References Cited

U.S. PATENT DOCUMENTS

| 9,965,685 B2 * | 5/2018 | Matsuoka .......... G08B 21/0208 |
| 10,223,934 B2 * | 3/2019 | Paul ....................... G09B 19/04 |
| 11,763,798 B2 * | 9/2023 | Laput .................... G10L 13/033 |
| | | 704/231 |

(Continued)

FOREIGN PATENT DOCUMENTS

| CN | 111433843 A | * | 7/2020 | ............... G06N 3/04 |
| EP | 3940698 A1 | * | 1/2022 | |
| WO | WO-2010033533 A2 | * | 3/2010 | ............. G06F 16/68 |

*Primary Examiner* — Richemond Dorvil
*Assistant Examiner* — Nadira Sultana
(74) *Attorney, Agent, or Firm* — Kilpatrick Townsend & Stockton LLP

(57) ABSTRACT

Systems and techniques are provided for sound model localization within an environment. Sound recordings of sounds in the environment may be received from devices in the environment. Preliminary labels for the sound recordings may be determined using pre-trained sound models. The preliminary labels may have associated probabilities. Sound clips with preliminary labels may be generated based on sound recordings that have preliminary labels whose probability is over a high-recall threshold for the pre-trained sound model that determined the preliminary label. The sound clips with preliminary labels may be sent to a user device. Labeled sound clips may be received from the user device. The labeled sound clips may be based on the sound clips with preliminary labels. Training data sets may be generated for the pre-trained sound models using the labeled sound clips. The pre-trained sound models may be trained using the training data sets to generate localized sound models.

20 Claims, 13 Drawing Sheets

(56) References Cited

U.S. PATENT DOCUMENTS

| | | | | |
|---|---|---|---|---|
| 2011/0075851 A1* | 3/2011 | LeBoeuf | ............... | G10L 25/51 |
| | | | | 381/56 |
| 2012/0224706 A1* | 9/2012 | Hwang | ................ | G10L 15/20 |
| | | | | 381/56 |
| 2014/0255887 A1* | 9/2014 | Xu | ..................... | A61B 5/168 |
| | | | | 434/169 |
| 2016/0364963 A1* | 12/2016 | Matsuoka | ............ | G06V 10/764 |
| 2018/0233125 A1* | 8/2018 | Mitchell | ............. | G10L 25/78 |
| 2018/0293988 A1* | 10/2018 | Huang | ................ | G10L 17/20 |
| 2020/0349953 A1* | 11/2020 | Qin | ..................... | G10L 15/26 |

\* cited by examiner

SOUND MODEL LOCALIZATION WITHIN AN ENVIRONMENT

BACKGROUND

Pre-trained sound models may be used in conjunction with machine learning systems to detect specific sounds recorded by microphones in an environment. A pre-trained sound model may be a generic model trained with examples of the specific sound the model is meant to detect. The examples may be obtained from any of a variety of sources, and may represent any number of variations of the sound the pre-trained sound model is being trained to detect. The pre-trained sound models may be trained outside of an environment before being stored on the devices in an environment and operated to detect the sounds they were trained to detect. Devices may receive the same pre-trained sound models regardless of the environment the devices end up operating in. The pre-trained sound models may be replaced with updated versions of themselves generated outside the environments in which the pre-trained sound models are in use.

BRIEF SUMMARY

According to an embodiment of the disclosed subject matter, a computing device in an environment may receive, from devices in the environment, sound recordings made of sounds in the environment. The computing device may determine preliminary labels for the sound recordings using pre-trained sound models, wherein each of the preliminary labels has an associated probability. The computing device may generate sound clips with preliminary labels based on the sound recordings that have determined preliminary labels whose associated probability is over a high-recall threshold for the one of the pre-trained sound models that determined the preliminary label. The computing device may send the sound clips with preliminary labels to a user device. The computing device may receive labeled sound clips from the user device, wherein the labeled sound clips are based on the sound clips with preliminary labels. The computing device may generate training data sets for the pre-trained sound models using the labeled sound clips. The pre-trained sound models may be trained using the training data sets to generate localized sound models.

Additional labeled sound clips may be received from the user device based on sounds recorded in the environment using the user device, wherein the additional labeled sound clips are used in the generating of the training data sets.

Before sending the sound clips with preliminary labels to the user device, additional labeled sound clips may be generated based on the sound recordings that have determined preliminary labels whose associated probability is over a normal threshold for the one of the pre-trained sound models that determined the preliminary label, wherein the additional labeled sound clips are used in the generating of the training data sets.

The computing device may generate the training data sets for the pre-trained sound models using the labeled sound clips by adding labeled sound clips with labels that match a label of one of the pre-trained sound models to a training data set for the one of the pre-trained sound models as positive examples and adding labeled sound clips with labels that don't match the label of the one of the pre-trained sound models to the training data set for the one of the pre-trained sound models as negative examples.

The sound recordings made in the environment may be automatically recorded by ones of the devices in the environment that have microphones.

The computing device and devices may be members of an environment-specific network for the environment, and wherein the sound recordings, the sound clips with preliminary labels, labeled sound clips, and training data sets are only stored on devices that are members of the environment-specific network for the environment.

Training the pre-trained sound models using the training data sets to generate localized sound models may include dividing operations for training the pre-trained sound models into processing jobs, sending the processing jobs to the devices in the environment, and receiving results of the processing jobs from the devices in the environment.

A federated training manager may run on the computing device and perform the dividing of the operations for training the pre-trained sound models into processing jobs, the sending of the processing jobs to the devices in the environment, and the receiving of the results of the processing jobs from the devices in the environment, and versions of a federated training client may run on the devices in the environment and receive the processing jobs and send the results of the processing jobs to the federated training manager on the computing device.

Additional labeled sound clips may be generated by performing augmentations on the labeled sound clips.

According to an embodiment of the disclosed subject matter, a means for receiving, on a computing device in an environment, from devices in the environment, sound recordings made of sounds in the environment, a means for determining, by the computing device, preliminary labels for the sound recordings using pre-trained sound models, wherein each of the preliminary labels has an associated probability, a means for generating, by the computing device, sound clips with preliminary labels based on the sound recordings that have determined preliminary labels whose associated probability is over a high-recall threshold for the one of the pre-trained sound models that determined the preliminary label, a means for sending, by the computing device, the sound clips with preliminary labels to a user device, a means for receiving, by the computing device, labeled sound clips from the user device, wherein the labeled sound clips are based on the sound clips with preliminary labels, a means for generating, by the computing device, training data sets for the pre-trained sound models using the labeled sound clips, a means for training the pre-trained sound models using the training data sets to generate localized sound models, a means for receiving, from the user device, additional labeled sound clips based on sounds recorded in the environment using the user device, wherein the additional labeled sound clips are used in the generating of the training data sets, a means for adding labeled sound clips with labels that match a label of one of the pre-trained sound models to a training data set for the one of the pre-trained sound models as positive examples, a means for adding labeled sound clips with labels that don't match the label of the one of the pre-trained sound models to the training data set for the one of the pre-trained sound models as negative examples, a means for dividing operations for training the pre-trained sound models into processing jobs, a means for sending the processing jobs to the devices in the environment, a means for receiving results of the processing jobs from the devices in the environment, and a means for generating additional labeled sound clips by performing augmentations on the labeled sound clips, are included.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Figure 1:
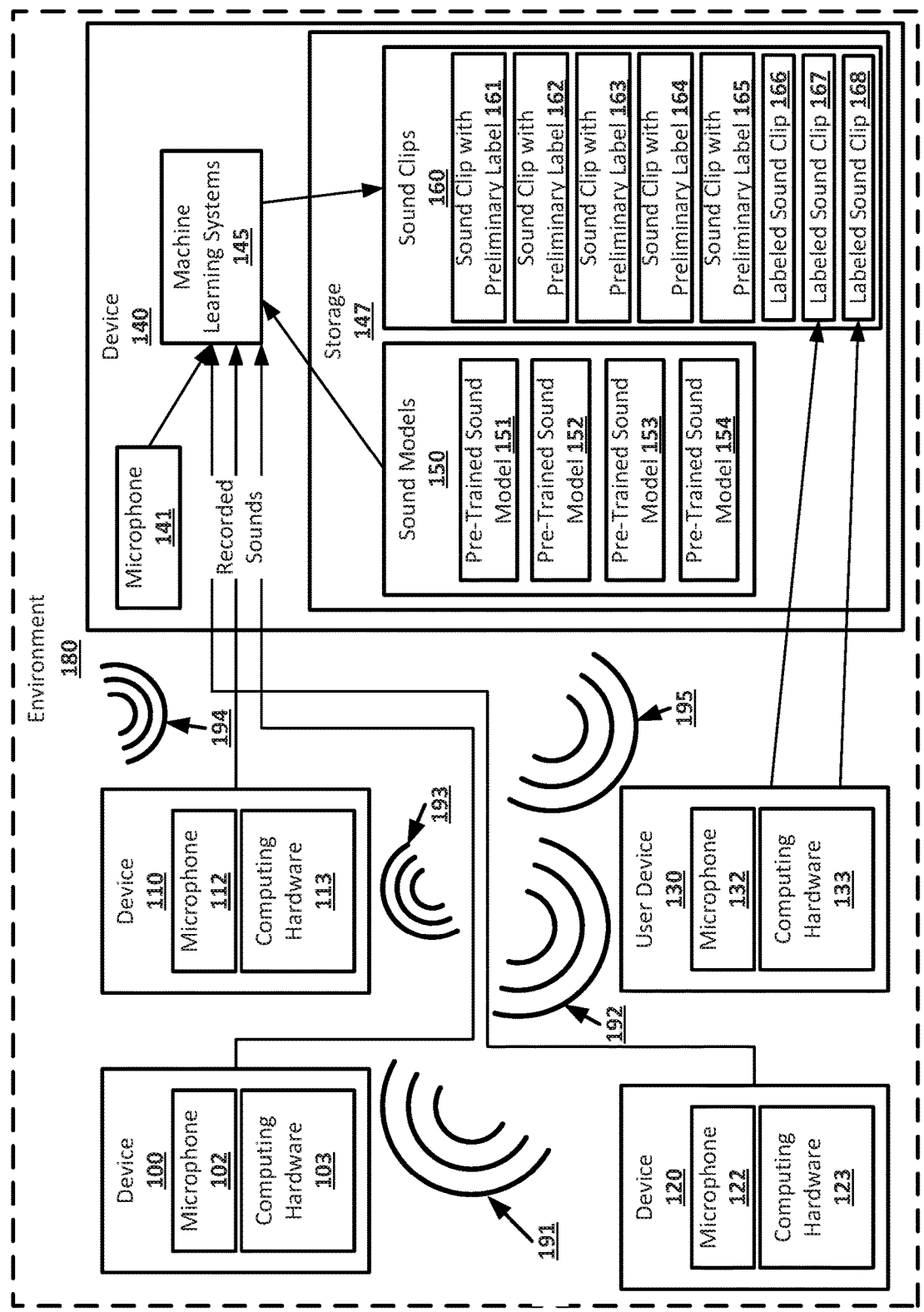
FIG. 1 shows an example system and arrangement suitable for sound model localization within an environment according to an implementation of the disclosed subject matter.

According to embodiments disclosed herein, sound model localization within an environment may allow for sound models that have been pre-trained to be further trained within an environment to better detect sounds in that environment. Sound models, which may be pre-trained, may be stored on devices in an environment. Devices with microphones in the environment may record sounds that occur within the environment. The sounds may be recorded purposefully by a user, or may be recorded automatically by the devices with microphones. A user may label the sounds they purposefully record, and sounds recorded automatically may be presented to the user so that the user may label the sounds. Sounds recorded automatically may also be labeled by one of the sound models running on the devices in the environment. The labeled sounds recorded in the environment may be used to further train the sound models in the environment, localizing the sound models to the environment. Training of the sound models may occur on individual devices within the environment, and may be distributed across the devices within the environment. The recorded sounds used for training may remain within the environment, preventing sensitive data from being transmitted or stored outside of the environment during the training of the sound models.

An environment may include a number of devices. The environment may be, for example, a home, office, apartment, or other structure, outdoor space, or combination of indoor and outdoor spaces Devices in the environment may include, for example, lights, sensors including passive infrared sensors used for motion detection, light sensors, cameras, microphones, entryway sensors, light switches, as well as mobile device scanners that may use Bluetooth, WiFi, RFID, or other wireless devices as sensors to detect the presence of devices such as phones, tablets, laptops, or fobs, security devices, locks, A/V devices such as TVs, receivers, and speakers, devices for HVAC systems such as thermostats, motorized devices such as blinds, and other such controllable device. The devices may also include general computing devices, such as, for example, phones, tablets, laptops, and desktops. The devices within the environment may include computing hardware, including processors, volatile and non-volatile storage, and communications hardware for wired and wireless network communication, including WiFi, Bluetooth, and any other form of wired or wireless communication. The computing hardware in the various devices in the environment may differ. The devices in the environment may be connected to the same network, which may be any suitable combination of wired and wireless networks, and may involve mesh networking, hub-and-spoke networking, or any other suitable form of network communications. The devices in the environment may be members of an environment-specific network. A device may need to be authorized by a user, for example, a non-guest occupant of the environment, to become a member of the environment-specific network. The environment-specific network may be more exclusive than a local area network (LAN) in the environment. For example, the environment may include a Wi-Fi router that may establish a Wi-Fi LAN in the environment, and may also allow devices connected to the Wi-Fi LAN to connect to a wide area network (WAN) such as the Internet. Devices that are granted access to the Wi-Fi LAN in the environment may not be automatically made members of the environment-specific network, and may need to be authorized by a non-guest occupant of the environment to join the environment-specific network. This may allow guest devices to use a LAN, such as a Wi-Fi LAN, in the environment, while preventing the guest device from joining the environment-specific network. Membership in the environment-specific network may be managed within the environment, or may be managed using a cloud server system remote from the environment.

Some of the devices in the environment may include microphones. The microphones may be used to record sounds within the environment. The recorded sounds may be processed using any number of sound models, which may attempt to detect specific sounds in the recorded sounds. This may occur, for example, in real-time, as detected sounds may be used to determine data about the current state of the environment, such as, for example, the number, identity, and status of current occupants of the environment, including people and animals, and the operating status of various features of the environment, including doors and windows, appliances, fixtures, and plumbing. Individual sound models may be trained to detect different individual sounds, and each sound model may be labeled with the sound it has been trained to detect. For example, a sound model labeled "doorbell" may detect doorbells, another sound model labeled "closing door" may detect a door closing, and another sound model labeled "cough" may detect a person coughing. There may be sound models that detect, for example, coughing, snoring, sneezing, voices, pet noises, leaking water, babies crying, toilets flushing, sinks running, showers running, dishwashers running, refrigerators running, and any other sound that may occur within an environment such as a home. The sound models may be models for any suitable machine learning system, such as a Bayesian network, artificial neural network, support vector machine, classifier of any type, or any other suitable statistical or heuristic machine learning system type. For example, a sound model may include the weights and architecture for a neural network of any suitable type.

The sound models initially used by the devices in an environment may be pre-trained sound models which may be generic to the sounds they are meant to detect and identify. The sound models may have been pre-trained, for example, using sound datasets that were donated or synthesized. For example, a sound model to detect a doorbell may be pre-trained using examples of various types of doorbells and other sounds that could possibly be used as a doorbell sound, such as music. A sound model to detect a cough may be pre-trained using examples of coughs from various different people, none of whom may have any connection to the environment the sound model will operate in. The sound models may be stored on the devices as part of the manufacturing process, or may be downloaded to the devices from a server system after the devices are installed in an environment and connected to the Internet. Any number of sound models may be operating in the environment at any time, and sound models may be added to or removed from the devices in the environment at any time and in any suitable manner. For example, five hundred or more sound models may be operating in the same environment, each detecting a different sound.

Devices with microphones in the environment may record sounds that occur within the environment to generate sound clips. The sounds may be recorded purposefully by a user. For example, a user in the environment may use a phone to purposefully record sounds of interest, generating sound clips of those sounds. The user may use any suitable device with a microphone to record sounds, including, for example, phones, tablets, laptops, and wearable devices.

Sounds may also be recorded automatically by devices in the environment without user intervention. For example, devices in the environment with microphones may record sounds and process them with sound models in real time as each sound model determines if the sound it is trained to detect is in the recorded sound. To process a recorded sound with a sound model, the recorded sound may be input to a machine learning system that may be using the sound model. For example, the recorded sound may be input to machine learning system for neural network using weights and architecture from a sound model, with the recorded sound input to the input layer of the sound model. The recorded sound may be prepared in any suitable manner to be processed by a sound model, including, for example, being filtered, adjusted, and converted into an appropriate data type for input to the sound model and the machine learning system that uses the sound model.

The sound models may be operated in high-recall mode to generate sound clips from the sounds processed by the sound models. When a sound model is operating in high recall mode, the probability threshold used to determine whether the sound model has detected that sound it was trained to detect may be lowered. For example, a sound model for a door opening may use a probability threshold of 95% during normal operation, so that it may only report a sound processed by the sound model as being the sound of a door opening when the output of the sound model is probability of 95% or greater that the sound processed by the sound model includes the sound of a door opening. A sound model operating in high-recall mode may use a lower high-recall probability threshold of, for example, around 50%, resulting in the sound model reporting more recorded sounds processed by the sound model as including the sounds of a door opening. Operating a sound model in a high-recall mode may result in the generation of more sound clips of recorded sounds that are determined to be the sound the sound model was trained to detect, although some of these sounds may end up not actually being the sound the sound model was trained to detect. For example, operating the sound model for the door opening in high-recall mode may result in the sound model determining that sounds that are not a door opening as being the sound of a door opening. This may allow for the generation of more sound clips for the sound model that may serve as both positive and negative training examples when compared to operating the sound model in a normal mode with a high probability threshold, and may generate better positive training examples for edge cases of the sound the sound model is trained to detect.

One of the sound models used in the environment may be an interesting sound classifier. The sound model for an interesting sound classifier may be trained to detect any sounds that may be considered interesting, for example, any sound that does not appear to be ambient or background noise. The sound model for the interesting sound classifier may generate sound clips from sounds recorded in the environment that the sound model determines are interesting. The sound model for the interesting sound classifier may operate using a normal probability threshold, or may operate in high-recall mode.

Sound clips generated from automatically recorded sounds may be given preliminary labels. The preliminary label for a sound clip may be based on the label of the sound model that determined that the probability that the sound in the sound clip was the sound the sound model was trained to detect exceeded the probability threshold, whether normal or high-recall, in use by the sound model. The preliminary label given to a sound clip by a sound model may be the label of the sound model. For example, a sound model for door opening may determine that there is a 65% probability that a recorded sound processed with the sound model is the sound of a door opening. If the sound model for door opening is operating in high-recall mode with a probability threshold of 50%, the recorded sound may be used to generate a sound clip that may be assigned a preliminary label of "door opening", which may also be the label of the sound model.

The same sound clip may be given multiple preliminary labels. Every recorded sound may be processed through all of the available sound models on devices in the environment, even when the sound models are operating on devices different from the devices that recorded the sound. For some recorded sounds, multiple sound models may determine that the probability that the recorded sound is the sound the sound model was trained to detect exceeds the probability threshold in use by that sound model. This may result in the sound clip generated from the recorded sound being given multiple preliminary labels, for example, one label per sound model that determined the recorded sound was the sound the sound model was trained to detect.

Some recorded sounds may not have any of the sound models determine that the probability that the recorded sound is the sound the sound model is trained to detect exceed the probability threshold in use by the sound model. These recorded sounds may be discarded, or may be used to generate sound clips that may be given a preliminary label indicating that the sound is unknown.

The sound clips generated from recorded sounds in the environment may be stored in any suitable manner. For example, sound clips may be stored on the devices responsible for recording the sound that was processed by the sound model, on the device responsible for processing the recorded sound with the sound model if it is different from the device that recorded the sound, or on any other device in the environment. For example, all of the sound clips may be stored on a single device in the environment, for example, the device with greatest amount of available non-volatile storage. This device may also be responsible for operating all, or many, of the sound models, as the device may also have the most available processing power of the devices in the environment. Sound clips generated from automatically recorded sounds that were input to the sound models may be stored along with their preliminary labels.

Sound clips may only be stored on devices that are members of the environment-specific network. This may prevent sound clips generated from sound recorded within the environment from being stored on devices that are guests within the environment and have not been authorized by a non-guest occupant of the environment to join the environment-specific network.

The sound clips generated from recording sounds in the environment may be labeled. Sound clips purposefully recorded by a user may be labeled by the user, for example, using the same device, such as a phone, that was used to record the sound for the sound clip, or using any other device that may be able to playback the sound clip to the user and receive input from the user. The user may label the sound clip through a user interface that allows the user to input text to be used to label the sound clip. For example, if the user recorded a sound clip of their front doorbell, they may label the sound clip as "front doorbell" or "doorbell." The user may be able to place delimiters in the sound clip that they are labeling to indicate that start of the end of the sound being labeled, for example, when the recording was started some time before the sound or was stopped some time after the sound.

Sound clips recorded automatically by devices in the environment may be presented to the user so that the user may label the sounds. The sound model that processed the recorded sound used to generate the sound clip may have determined that the sound was of the type the sound model was trained to detect, for example, exceeding the probability threshold used by the sound model operating in either normal or high-recall mode. The sound clip may be presented to the user on any suitable device that may be able to playback audio and receive input from the user. The sound clip may be presented along with any preliminary labels given to the sound clip by the sound models. If the sound clip was given only one preliminary label, the user may select whether the preliminary label accurately identifies the sound in the sound clip. If the sound clip was given multiple preliminary labels, the user may select the preliminary label that accurately identifies the sound in the sound clip. If none of the preliminary labels given to a sound clip accurately identify the sound in the sound clip, the user may enter a label for the sound clip or may indicate that the sound in the sound clip is unknown. If a sound clip was generated by the sound model for the interesting sound classifier, the sound clip may be presented to the user with no preliminary label or a placeholder preliminary label, and the user may enter a label for the sound clip or may indicate that the sound in the sound clip is unknown.

The number of automatically recorded sound clips presented to a user to be labeled may be controlled in any suitable manner. For example, sound clips may be randomly sampled for presentation to a user, or sound clips with certain preliminary labels may be presented to the user. Sound clips may also be selected for presentation to the user based on the probability determined by the sound model that gave the sound clip a preliminary label that the sound in the sound clip is the sound the sound model was trained to detect. For example, sound clips with probabilities within a specified range may be presented to the user. This may prevent the user from being presented with too many sound clips.

Sounds recorded automatically may also be labeled by one of the sound models running on the devices in the environment. When a sound model determines that there is a high probability that the sound in a sound clip is the sound the sound model was trained to detect, the preliminary label given to the sound clip by the sound model may be used as the label for the sound clip without requiring presentation to the user. For example, when a sound model for door opening determines that there is a 95% probability that a recorded sound is the sound of a door opening, the "door opening" preliminary label given to the sound clip for the recorded sound may be used as the label for the sound clip without input from the user. The sound clip with the sound that was determined to be a door opening with a 95% probability may not be presented to the user for labeling.

The labeled sound clips of sounds recorded in the environment may be used to further train the sound models in the environment in order to localize the sound models to the environment. The labeled sound clips may be used to create training data sets for the sound models. A training data set for a sound model may include positive examples and negative examples of the sound the sound model is trained to detect. Sound clips with labels that match the label of a sound model may be added to the training data set for that sound model as positive examples. For example, sound clips labeled as "doorbell" may be added to the training data set for the sound model for the doorbell as positive examples. Sound clips with labels that do not match the label of a sound model may be added to the training data set for that sound model as negative examples. For example, sound clips labeled as "cough" or "door opening" may be added to the training as set for the sound model for the doorbell as negative examples. This may result in training data sets for sound models where the positive and negative examples are sounds that occur within the environment. For example, the sound clips in the positive examples for the sound model for the doorbell may be the sound of the doorbell in the environment, as compared to the positive examples used in the pre-training of the sound model, which may be the sounds of various doorbells, and sounds used as doorbell sounds, from many different environments but not from the environment the sound model operates in after being pre-trained and stored on a device. The same labeled sound clip may be used as both positive and negative examples in the training data sets for different sound models. For example, a sound clip labeled "doorbell" may be a positive example for the sound model for doorbells and a negative example for the sound model for coughs.

Augmentation of labeled sound clips may be used to increase the number of sound clips available for training data sets. For example, a single labeled sound clip may have room reverb, echo, background noises, or other augmentations applied through audio processing in order to generate additional sound clips with the same label. This may allow for a single labeled sound clip to serve as the basis for the generation of multiple additional labeled sound clips, each of which may serve as positive and negative examples in the same manner as the sound clip they were generated from.

The training data sets created for the sound models may be used to train the sound models. Each sound model may be trained with the training data set generated for it from the sound clips, for example, the training data set whose positive examples have labels that match the label of the sound model. The sound models may be trained using the training data sets in any suitable manner. For example, the sound models may be models for neural networks, which may be trained using, for example, backpropagation based on the errors made the sound model when evaluating the sound clips that are positive and negative examples from the training data set of the sound the sound model is trained to detect. This may allow the sound models to be trained with sounds specific to the environment that the sound models are operating in, for example, training the sound model for the doorbell to detect the sound of the environment's specific doorbell, or training the sound model for coughs to detect the sound of the coughs of the environment's occupants. This may localize the sound models to the environment in which they are operating, further training the sound models beyond the pre-training on donated or synthesized data sets of sounds that may represent the sounds of various different environments. Pre-trained sound models that detect the same sound and are operating on devices in different environments may start off as identical, but may diverge as each is trained with positive examples of the sound from its separate environment, localizing each sound model to its environment.

Training of the sound models may occur on individual devices within the environment, and may also be distributed across the devices within the environment. The training may occur only on devices that are members of the environment-specific network, to prevent the labeled sound clips from being transmitted outside of the environment or stored on devices that will leave the environment and do not belong to non-guest occupants of the environment unless authorized by a non-guest occupant of the environment. Different devices in the environment that are members of the environment-specific network may have different available computing resources, including different levels of volatile and non-volatile memory and different general and special purpose processors. Some of the devices in the environment may be able to train sound models on their own. For example, a phone, tablet, laptop, or hub device may have sufficient computational resources to train sound models using the labeled sound clips in the training data sets without assistance from any other device in the environment. Such a device may also perform augmentation on label sound clips to generate additional sound clips for the training data sets.

Devices that do not have sufficient computational resources to train sound models on their own may participate in federated training of the sound models. In federated training, the training of a sound model may be divided into processing jobs which may require fewer computational resources to perform than the full training. The processing jobs may be distributed to devices that are members of the environment-specific network and do not have the computational resource to train the sound models on their own, including devices that do not have microphones or otherwise did not record sound used to generate the sound clips. These devices may perform the computation needed to complete any processing jobs they receive and return the results. A device may receive any number of processing jobs, either simultaneously or sequentially, depending on the computational resources available on that device. For example, devices with very small amounts of volatile and non-volatile memory may receive only one processing job at time. The training of a sound model may be divided into processing jobs by a device that is a member of the environment-specific network and does have the computation resources to train a sound model on its own, for example, a phone, tablet, laptop, or hub device. This device may manage the sending of processing jobs to the other devices in the environment-specific network, receive results returned by those devices, and use the results train the sound models. The recorded sounds used for training may remain within the environment, preventing sensitive data from being transmitted outside of the environment during the training of the sound models. Each of the devices may run a federating training program built-in to, or on top of, their operating systems that may allow the devices to manage and participate in federated training. The federating training program may have multiple versions to allow it to be run on devices with different amounts and types of computing resources. For example, a client version of the federated training program may run on devices that have fewer computing resources and will be the recipients of processing jobs, while a server version of the federated training program may run on devices that have more computing resources and may generate and send out the processing jobs and receive the results of the processing jobs.

Sound models for sounds associated with people may be individualized in addition to being localized. Multiple sound models for sounds associated with a person, such as voice, cough, snore, or sneeze, may operate within an environment. For example, instead of having a single sound model for a person's cough, multiple sound models for coughs may operate within an environment. Each of the multiple sound models may start off the same, having been pre-trained to detect the same sound, for example, a cough, but may be trained to be specific to an individual occupant of the environment. When a user is asked to label a sound clip whose preliminary label is a sound associated with a person, for example, a "cough", the user may be asked to specify which person is responsible for the sound, for example, whose cough it is. This may result in the creation of separate training data sets for each person's version of a sound, such as their individual cough, each of which may be used train a separate one of the sound models for that sound. For example, the training data set for a specific person's cough may use sound clips labeled as being that person's cough as positive examples and sound clips labeled as being other persons' coughs as negative examples. The sound models for a sound associated with a person may diverge as they are each trained to detect a specific person's version of the sound, for example, their cough, based on a training data set where that specific person's version of the sound is a positive example and other people's versions of the sound are negative examples.

Training of the sound models operating within the environment may be ongoing while the sound models are operating, and may occur at any suitable times and intervals. Automatic recording of sounds to generate sound clips may occur at any time, and sound clips may be presented to users for labeling at any suitable time. Labeled sound clips, whether labeled by users or automatically, may be used to generate and update training data sets as the labeled sound clips are generated, or at any suitable time or interval. Some sound models in the environment may not operate until they have undergone training to localize the sound model. For example, a sound model for a doorbell may have been trained on a wide variety of sounds, and may not be useful within an environment until the sound model has been trained using positive examples of the environment's doorbell.

The output of the localized sound models may be used in any suitable manner. For example, the sounds detected by the sound models may be used to determine data about the current state of the environment, such as, for example, the number, identity, and status of current occupants of the environment, including people and animals, and the operating status of various features of the environment, including doors and windows, appliances, fixtures, and plumbing. Individual sound models may detect individual sounds. Determinations made using sounds detected by the sound models may be used to control devices in the environment, including lights, sensors including passive infrared sensors used for motion detection, light sensors, cameras, microphones, entryway sensors, light switches, security devices, locks, A/V devices such as TVs, receivers, and speakers, devices for HVAC systems such as thermostats, motorized devices such as blinds, and other such controllable device.

FIG. 1 shows an example system and arrangement suitable for sound model localization within an environment according to an implementation of the disclosed subject matter. An environment 180 may include devices 100, 110, 120, and 140, and user device 130. The environment 180 may be any suitable environment or structure, such as, for example, a house, office, apartment, or other building, or area with any suitable combination of indoor and outdoor spaces. The devices 100, 110, 120, and 140 may be any suitable devices that may be located in the environment 180 that may include microphones 102, 112, 122, and 141, such as sensor devices, camera devices, speaker devices, voice-controlled devices, and other A/V devices. For example, the device 100 may be a sensor device that may include the microphone 102 and a PIR sensor. The device 110 may be a camera device that may include the microphone 112 and a camera. The device 120 may be a small speaker device that may include the microphone 122 and a speaker. The device 140 may be a large speaker device that may include a microphone 141 and a speaker. The user device 130 may be a mobile computing device, such as a phone, that may include a display, speakers, a microphone, and computing hardware 133. The devices 100, 110, 120, 130, and 140 may be members of an environment-specific network for the environment 180.

The devices 100, 110, and 120 may include computing hardware 103, 113, and 123, and the user device 130 may include the computing hardware 133. The computing hardware 103, 113, 123, and 133 may be any suitable hardware for general purpose computing, including processors, network communications devices, special purpose computing, including special purposes processors and field programmable gate arrays, and storages that may include volatile and non-volatile storage. The computing hardware 103, 113, 123, and 133 may vary across the devices 100, 110, 120, and 130, for example, including different processors and different amounts and types of volatile and non-volatile storage, and may run different operating systems. The computing hardware 103, 113, 123, and 133 may be any suitable computing device or system, such as, for example, a computer 20 as described in FIG. 12. The device 140 may include computing hardware with a storage 147, may include volatile and non-volatile storage and may, for example, include more memory than the devices 100, 110, and 120. The device 140 may including computing hardware that may be any suitable computing device or system, such as, for example, a computer 20 as described in FIG. 12

Sounds 191, 192, 193, 194, and 195 may be any suitable sounds that may occur within the environment 180. For example, the sound 195 may be the sound of a doorbell, the sound 191 may be the sound of a person's cough, the sound 192 may be the sound of a sink running, the sound 193 may be ambient noise, and the sound 194 may be a sound made by a pet. The microphones 102, 112, 122, and 141 may automatically record sounds occurring in the environment 180 that reach them, as they may be left open. For example, the sound 191 may reach the microphones 102 and 122. The sound 192 may reach the microphones 122 and 132. The sound 193 may reach the microphone 112. The sound 194 may reach the microphones 112 and 141. The sound 195 may reach the microphone 132. The microphone 132 may be purposefully used, by a user of the user device 130, to record the sounds 192 and 195 that reach the microphone 132.

The sounds automatically recorded by the microphones 102, 112, and 122, may be sent to the device 140. The device 140 may include, in the storage 147, sound models 150, including pre-trained sound models 151, 152, 153, and 154 that may be operating in the environment 180. The pre-trained sound models 151, 152, 153, and 154 may be models for the detection of specific sounds that may be used in conjunction with a machine learning system, and may be, for example, weights and architectures for neural networks, or may be models for Bayesian networks, artificial neural networks, support vector machines, classifiers of any type, or any other suitable statistical or heuristic machine learning system types. Each of the pre-trained sound models 151, 152, 153, and 154 may have been pre-trained, for example, using donated or synthesized sound data for sounds that were recorded outside of the environment 180 to detect a different sound before being stored in the storage 147. For example, the pre-trained sound model 151 may detect coughs, the pre-trained sound model 152 may detect the sound of a doorbell, the pre-trained sound model 153 may detect the sound of a pet, and the pre-trained sound model 154 may detect the sound of a sink running.

The device 140 may process the sounds automatically recorded by the microphones 102, 112, 122, and 141 using the sound models 150 and machine learning systems 145. The machine learning systems 145 may be any suitable combination of hardware and software for implementing any suitable machine learning systems that may use the sound models 150 to detect specific sounds in recorded sounds. The machine learning systems 145 may include, for example, artificial neural networks such as a deep learning neural networks, Bayesian networks, support vector machines, classifiers of any type, or any other suitable statistical or heuristic machine learning system types. The machine learning systems 145 may be implemented using any suitable type of learning, including, for example, supervised or unsupervised online learning or offline learning. The machine learning systems may process the recorded sounds from the microphones 102, 112, 122, and 141 using each of the pre-trained sound models 151, 152, 153, and 154. The output of the pre-trained sound models 151, 152, 153, and 154 may be, for example, probabilities that the recorded sounds are of the type the pre-trained sound models 151, 152, 153, and 154 were trained to detect.

The results of processing the sounds automatically recorded by the microphones 102, 112, 122, and 141 using the pre-trained sound models 151, 152, 153, and 154 may be used by the device 140 to generate and store sound clips with preliminary labels, such as the sound clips with preliminary labels 161, 162, 163, 164, and 165. A recorded sound may be stored as a sound clip and given a preliminary label when a sound model determines that the probability that the recorded sound includes the sound that sound model was trained to detect is greater than a threshold, which may be high, for example, in a normal operating mode for the sound model, or low, for example, in a high-recall operating mode for the sound model. For example, a recording of the sound 191 from the device 100 may be processed with the machine learning systems 145 using the pre-trained sound model 151 for detecting coughs operating in a high-recall mode with a probability threshold of 50%. The sound model 151 may output that the recording of the sound 191 has a 53% probability of including the sound of a cough. The recording of the sound 191 may be given a preliminary label of "cough" and stored as the sound clip with preliminary label 161. The same sound clip may be given more than one preliminary label. For example, if another of the sound models 150 determines that there is a probability greater than the threshold probability for that sound model that the recording of the sound 191 from the device 100 includes the sound the sound model was trained to detect, that sound model may also give the recording of the sound 191 a preliminary label which may be stored in the sound clip with preliminary label 161 The processing of the recorded sounds from the microphones 102, 112, 122, and 141 using the sound models 150 may result in the generation and storing of the sound clips with preliminary labels 162, 163, 164, and 165.

If a recorded sound processed using one of the sound models 150 operating in a normal mode or a high recall mode is determined to have a very high probability of including the sound that sound model was trained to detect, the label given to the sound clip generated from the recorded sound may not need to be a preliminary label. For example, the pre-trained sound model 154 may determine that there is a 95% probability that the recording of the sound 193 received from the device 100 includes the sound of running water from sink. The sound clip generated from the recording of the sound 193 received from the device 100 may be given the label of "running sink" and may be stored as a labeled sound clip 166. The label of "running sink" may not be considered preliminary.

In some implementations, the various sound models 150 may be stored on different devices in the environment 180, including the user device 130, and the automatically recorded sounds may be sent to the different devices to be processed using the sound models 150.

A user may use the user device 130 and the microphone 132 to purposefully record sounds. When the user purposefully records a sound with use device 130, the user may provide the label for the recorded sound. This label may be stored with a sound clip of the recorded sound. For example, the user may the use the user device 130 to record the sound 195, which may be the sound of the doorbell of a door of the environment 180. The user may provide the label "doorbell" to the recorded sound. The user may also trim the recorded sound to remove portions at the beginning or end of the recorded sound that do not include the sound of the doorbell. The user device 130 may use the recorded sound to generate a sound clip, and may send the sound clip and label of "doorbell" provided by the user to the device 140 to be stored with the sound clips 160 as labeled sound clip 167. Similarly, the user may use the user device 130 to purposefully record the sound 192 of a sink running and may provide the label "running sink", resulting in a labeled sound clip 168 being stored on the user device 140. The user may provide labels for recorded sounds in any suitable manner. For example, the user device 130 may display labels associated with the sound models 150 to the user so that the user may select a label for the recorded sound, or the user may enter text to provide the label for the recorded sound.

Figure 2A:
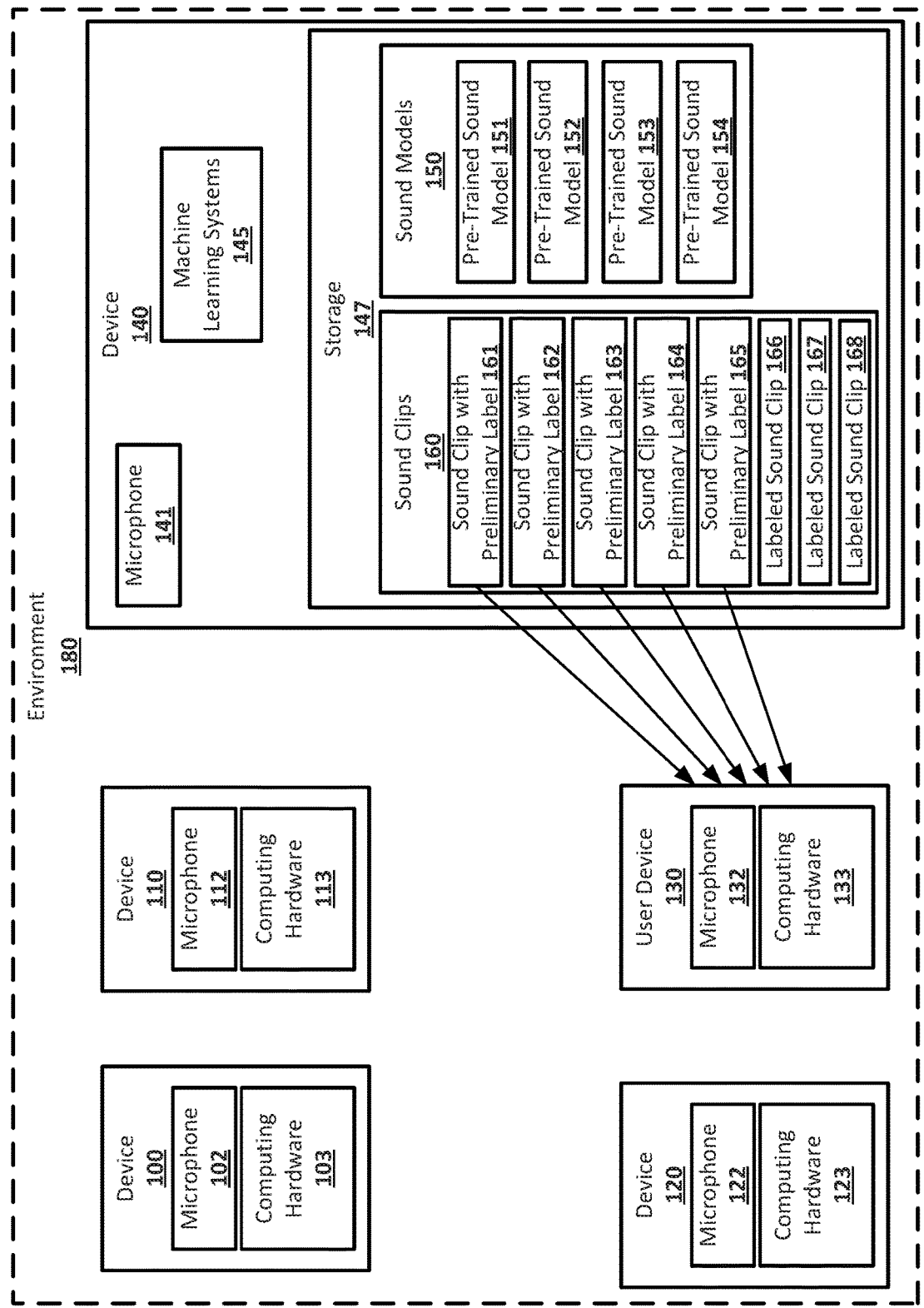
FIG. 2A shows an example system and arrangement suitable for sound model localization within an environment according to an implementation of the disclosed subject matter.

FIG. 2A shows an example system and arrangement suitable for sound model localization within an environment according to an implementation of the disclosed subject matter. The sound clips with preliminary labels 161, 162, 163, 164, and 165 may be sent to a user device to be labeled by a user. The device 140 may send the sound clips with preliminary labels 161, 162, 163, 164, and 165 to any device that is a member of the environment-specific network for the environment 180 that may include a speaker for playing back a sound clip to a user, a display for displaying the preliminary label to the user, and an input device to allow the user to select whether the preliminary label is correct and to input a correct label for the sound clip if the preliminary label is incorrect. For example, the sound clips with preliminary labels 161, 162, 163, 164, and 165 may be sent to the user device 130. The user may play back the sound clip with preliminary label 161, and may determine if the preliminary correctly identifies the sound in the sound clip. The sound clip with preliminary label 161 may include the sound of person coughing. If the preliminary label for the sound clip with preliminary label 161 is "cough", the user may input to the user device 130 that the preliminary label is correct. If the preliminary label for the sound clip with preliminary label 161 is "sneeze", the user may input to the user device 130 that the preliminary label is incorrect. The user may then enter the correct preliminary label, for example, by entering "cough" as text or by selecting it from a list of labels that are the sounds the various sound models 150 were trained to detect. The user may play back and provide labels to any number of the sound clips with preliminary labels 161, 162, 163, 164, and 165. In some implementations, the device 140 may only send some of the sound clips with preliminary labels 161, 162, 163, 164, and 165 to be labeled by a user, for example, pruning out certain ones of the sound clips with preliminary labels 161, 162, 163, 164, and 165 based on any suitable criteria so as not to occupy too much of the user's time and attention. The sound clips with preliminary labels 161, 162, 163, 164, and 165 may only be sent from the device 140 to the user device 130 while the use device 130 is connected to the same LAN as the device 140, for example, a Wi-Fi LAN of the environment 180. This may prevent transmission of the sound clips with preliminary labels 161, 162, 163, 164, and 165 to any devices outside of the environment 180 as they may not be transmitted over the Internet and may not need to pass through server systems outside of the environment 180.

Figure 2B:
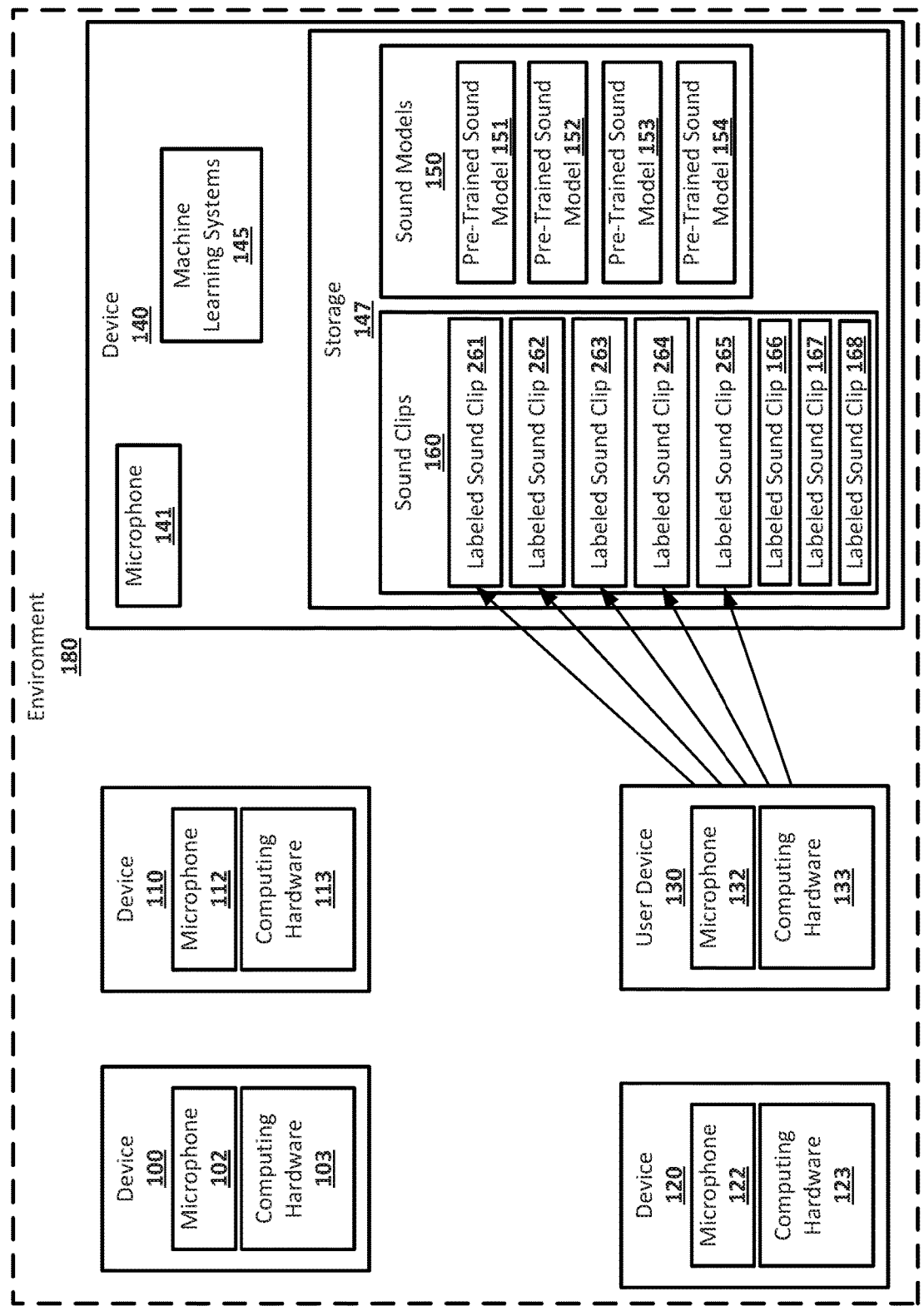
FIG. 2B shows an example system and arrangement suitable for sound model localization within an environment according to an implementation of the disclosed subject matter.

FIG. 2B shows an example system and arrangement suitable for sound model localization within an environment according to an implementation of the disclosed subject matter. The user device 130 may send the sound clips from the sound clips with preliminary labels 161, 162, 163, 164, and 165 to the device 140 along with the labels given to the sound clips by the user using the user device 130. The label for a sound clip may be the preliminary label if the user indicated that the preliminary label correctly identified the sound in the sound clip, or may be a label entered or selected by the user if the user indicated that the preliminary label did not correctly identify the sound in the sound clip. The sound clips and labels may be stored with the sound clips 160 as the labeled sound clips 261, 263, 262, 264, and 265.

Figure 3:
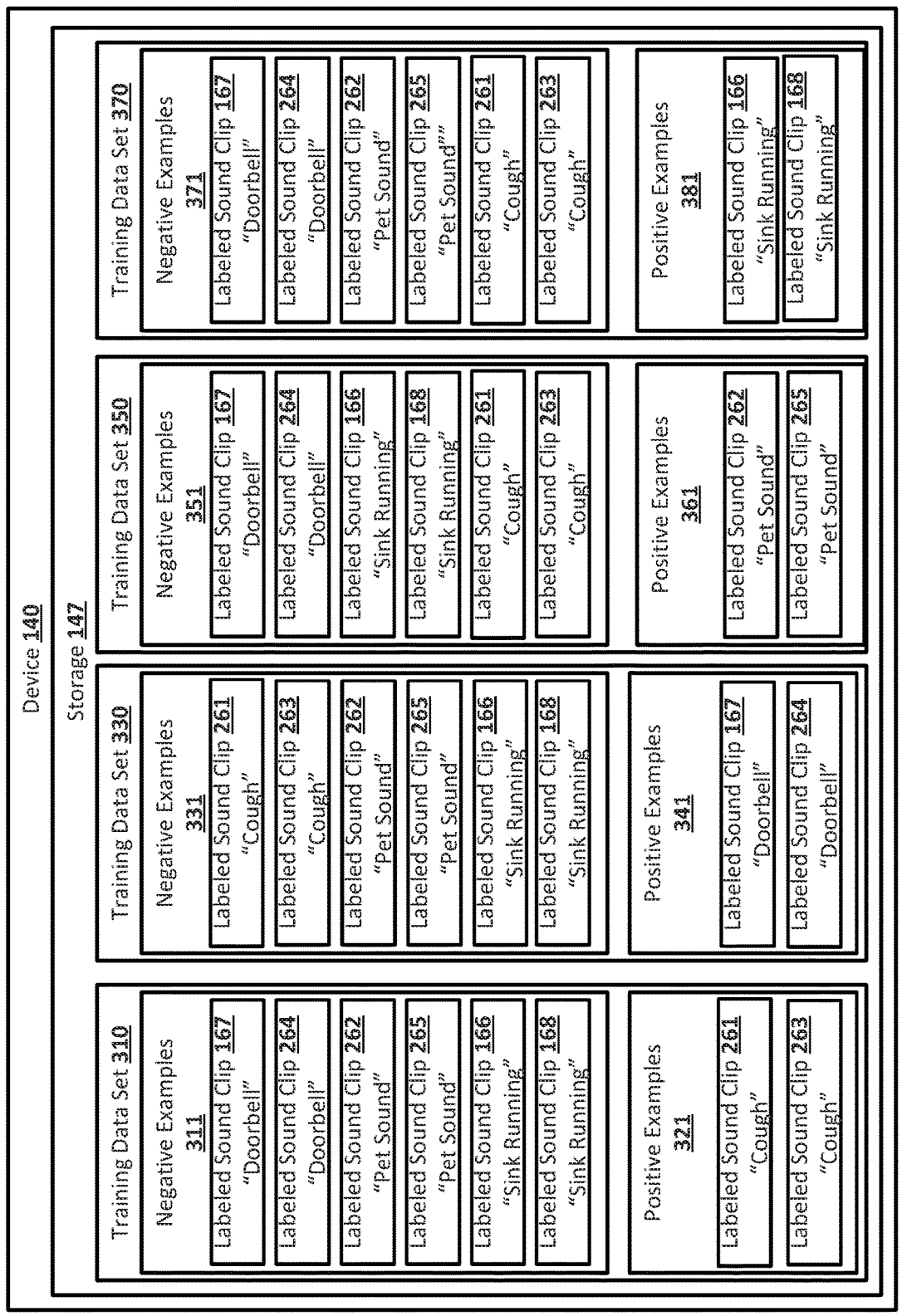
FIG. 3 shows an example system and arrangement suitable for sound model localization within an environment according to an implementation of the disclosed subject matter.

FIG. 3 shows an example system and arrangement suitable for sound model localization within an environment according to an implementation of the disclosed subject matter. The sound clips 160, after being labeled, may be used to generate training data sets that may be used to localize pre-trained sound models. For example, the labeled sound clips 166, 167, 168, 261, 262, 263, 264, and 265 may be used to generate training data sets 310, 330, 350, and 370, which may be intended to be used to further train, and localize, the pre-trained sound models 151, 152, 153, and 154. Labeled sound clips with labels that match the label of a sound model may be positive examples in the training data set for that sound model, while labeled sound clips with labels that don't match the label of a sound model may be negative examples in the training data set for that sound model.

The training data set 310 may be generated to train and localize the pre-trained sound model 151, which may have been pre-trained to detect the sound of a cough, and may be labeled "cough". The training data set 310 may include negative examples 311, which may be labeled sound clips whose label is something other than "cough", such as the labeled sound clips 167 and 264 with the label "doorbell", 262 and 265 with the label "pet sound", and 166 and 168 with the label "sink running." The training data set 310 may include positive examples 321, which may be labeled sound clips whose label is "cough", such as the labeled sound clips 261 and 263.

The training data set 330 may be generated to train and localize the pre-trained sound model 152, which may have been pre-trained to detect the sound of a doorbell, and may be labeled "doorbell". The training data set 330 may include negative examples 331, which may be labeled sound clips whose label is something other than "doorbell", such as the labeled sound clips 261 and 263 with the label "cough", 262 and 265 with the label "pet sound", and 166 and 168 with the label "sink running." The training data set 330 may include positive examples 341, which may be labeled sound clips whose label is "doorbell", such as the labeled sound clips 167 and 264.

The training data set 350 may be generated to train and localize the pre-trained sound model 153, which may have been pre-trained to detect the sound of a pet. The training data set 350 may include negative examples 351, which may be labeled sound clips whose label is something other than "pet sound", such as the labeled sound clips 167 and 264 with the label "doorbell", 261 and 263 with the label "cough", and 166 and 168 with the label "sink running." The training data set 350 may include positive examples 361, which may be labeled sound clips whose label is "pet sound", such as the labeled sound clips 262 and 265.

The training data set 370 may be generated to train and localize the pre-trained sound model 154, which may have been pre-trained to detect the sound of a sink running. The training data set 370 may include negative examples 371, which may be labeled sound clips whose label is something other than "sink running", such as the labeled sound clips 167 and 264 with the label "doorbell", 262 and 265 with the label "pet sound", and 261 and 263 with the label "cough." The training data set 371 may include positive examples 381, which may be labeled sound clips whose label is "sink running", such as the labeled sound clips 166 and 168.

The training data sets 310, 330, 350, and 370 may be generated on the device 140 and stored in the storage 170, or may be generated and stored on any of the devices that are members of the environment-specific network in the environment 180. Augmentations, such as the application reverb and background noise, may be applied to any of the labeled sound clips in order to generate additional labeled sound clips that may be used as positive and negative examples in the training data sets 310, 330, 350, and 370. The augmentations may be performed on the device 140, or on any other device that is a member of the environment-specific network for the environment 180.

Figure 4B:
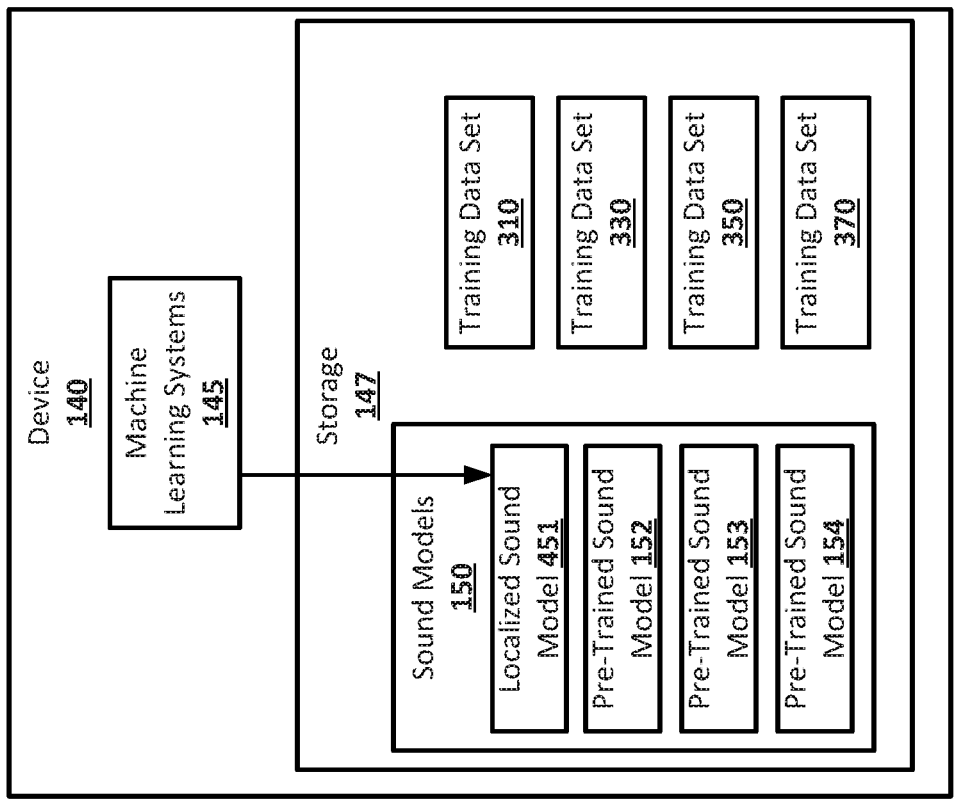
FIG. 4B shows an example system and arrangement suitable for sound model localization within an environment according to an implementation of the disclosed subject matter.
Figure 4A:
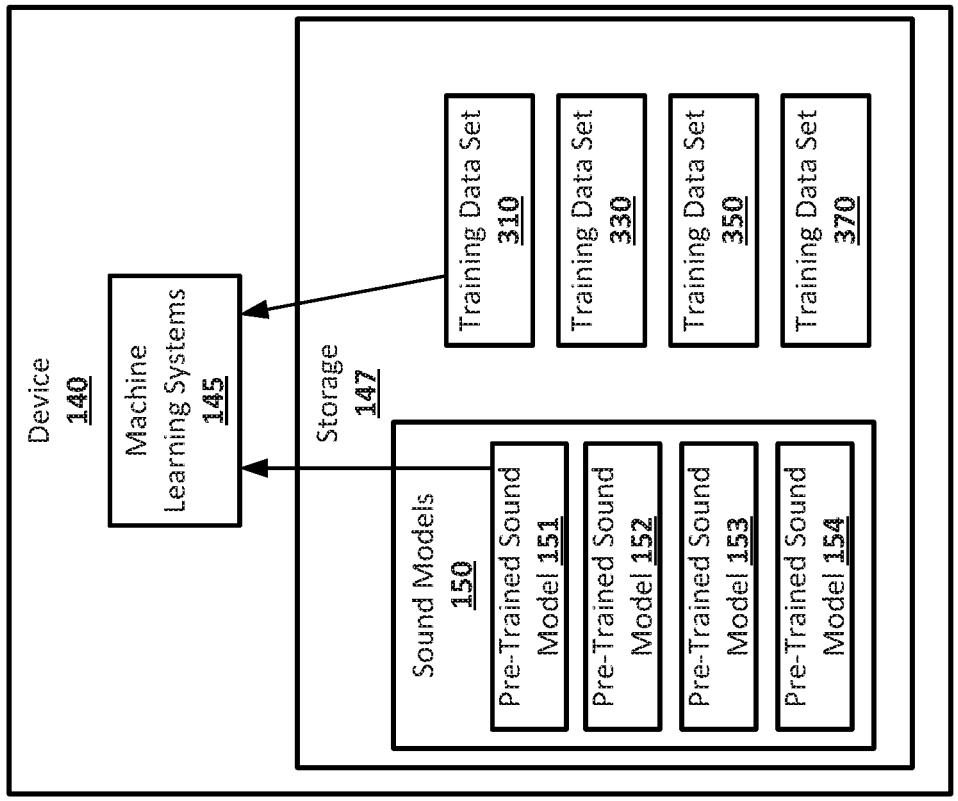
FIG. 4A shows an example system and arrangement suitable for sound model localization within an environment according to an implementation of the disclosed subject matter.

FIG. 4A shows an example system and arrangement suitable for sound model localization within an environment according to an implementation of the disclosed subject matter. The training data set 310 may be used by the machine learning systems 145 to further train, and localize, the pre-trained sound model 151. The training data set 310, including positive examples 321 and negative examples 261 may be used to train the pre-trained sound model 151 in any suitable manner based on the type of machine learning model used to implement the sound model. For example, if the pre-trained sound model 151 includes weights and architecture for a neural network, supervised training with backpropagation may be used to further train the pre-trained sound model 151 with the training data set 310.

FIG. 4B shows an example system and arrangement suitable for sound model localization within an environment according to an implementation of the disclosed subject matter. Through training the pre-trained sound model 151 with the training data set 310, the machine learning systems 145 may modify the pre-trained sound model 151, generating a localized sound model 451. The localized sound model 151 may be the result of the pre-trained sound model 151 for detecting coughs undergoing training with sound clips of coughs, and sound clips of sounds that are not coughs, recorded within the environment 180. This may result in the localized sound model 451 more accurately determining when a sound in the environment 180 is a cough, as the localized sound model 451 may better model the coughs that occur in the environment 180 than the pre-trained sound model 151, which was trained on coughs that did not occur in and were not recorded in the environment 180 and may differ from the coughs that do occur in the environment 180.

Figure 5:
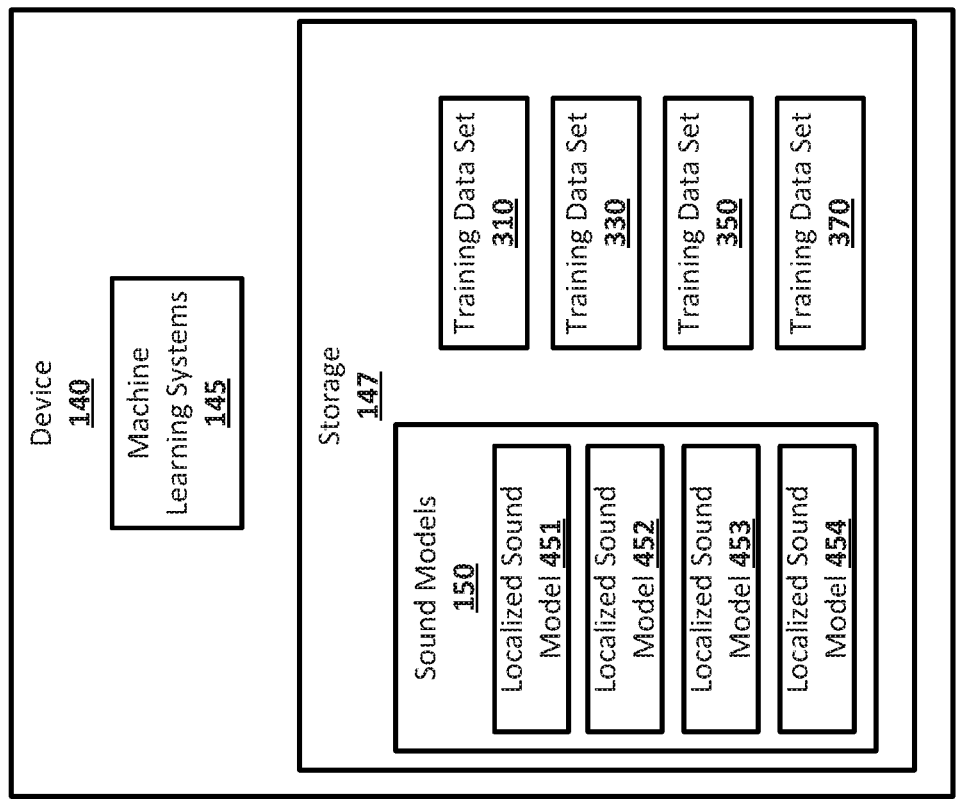
FIG. 5 shows an example system and arrangement suitable for sound model localization within an environment according to an implementation of the disclosed subject matter.

FIG. 5 shows an example system and arrangement suitable for sound model localization within an environment according to an implementation of the disclosed subject matter. The training data set 330 may be used by the machine learning systems 145 to further train, and localize, the pre-trained sound model 152, generating the localized sound model 452. The localized sound model 452 may be able to more accurately determine when a sound in the environment 180 is the sound of a doorbell of the environment 180, as the training data set 330 may include positive examples 321 that are labeled sound clips 167 and 264 of the doorbell of the environment 180. The pre-trained sound model 152 may have been trained using a variety of doorbell sounds which may or may not have included that specific sound of the doorbell of the environment 180, resulting in the pre-trained sound model 152 not being able to accurately determine when a sound in the environment 180 is the sound of the doorbell of the environment 180. The localized sound model 452 may be localized to the sound of the doorbell of the environment 180.

The training data set 350 may be used by the machine learning systems 145 to further train, and localize, the pre-trained sound model 153, generating the localized sound model 453. The localized sound model 452 may be able to more accurately determine when a sound in the environment 180 is the sound of a pet of the environment 180, as the training data set 330 may include positive examples 321 that are labeled sound clips 167 and 264 of a pet of the environment 180. The pre-trained sound model 152 may have been trained using a variety of pet sounds which may be from animals that are different from the pet of the environment 180, resulting in the pre-trained sound model 152 not being able to accurately determine when a sound in the environment 180 is the sound of a pet of the environment 180.

The training data set 370 may be used by the machine learning systems 145 to further train, and localize, the pre-trained sound model 154, generating the localized sound model 454. The localized sound model 452 may be able to more accurately determine when a sound in the environment 180 is the sound of a running sink of the environment 180, as the training data set 330 may include positive examples 321 that are labeled sound clips 167 and 264 of the running sink of the environment 180. The pre-trained sound model 152 may have been trained using a variety of running sink sounds which may be from sinks different from those of the environment 180, resulting in the pre-trained sound model 152 not being able to accurately determine when a sound in the environment 180 is the sound of the running sink of the environment 180.

Figure 6:
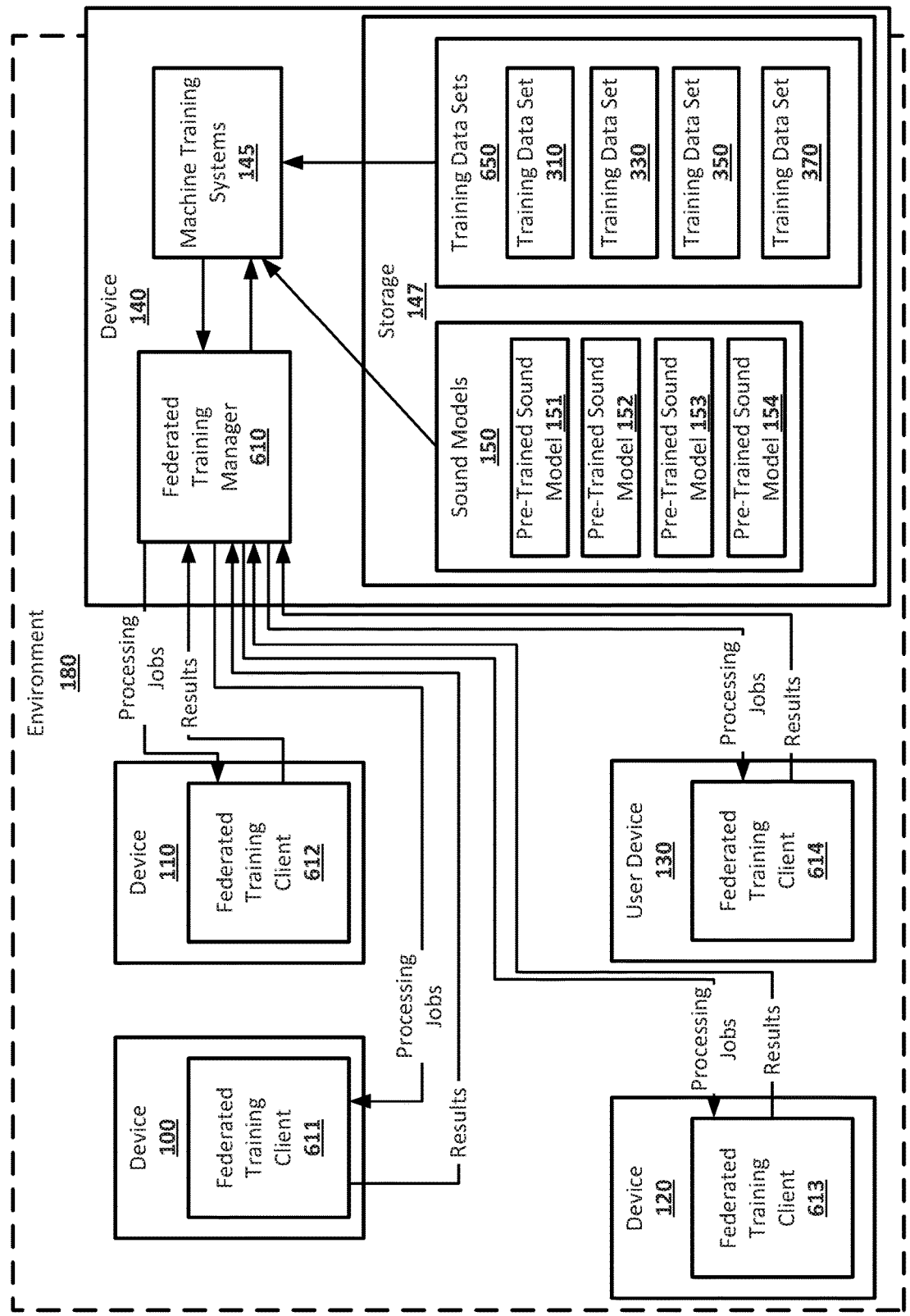
FIG. 6 shows an example system and arrangement suitable for sound model localization within an environment according to an implementation of the disclosed subject matter.

FIG. 6 shows an example system and arrangement suitable for sound model localization within an environment according to an implementation of the disclosed subject matter. Training of the sound models 150 using training data sets 650, including, for example, the training data sets 310, 330, 350, and 370, may use federated training. The device 140 may include a federated training manager 610. The federated training manager 610 may be any suitable combination of hardware and software, including an application running on or built-in to an operating system of the device 140, for managing various aspects of the training of the sound models 150. The federated training manager 610 may, for example, control the receiving and storage of the sounds clips with preliminary labels and labeled sound clips by the device 140, the sending by the device 140 of the sound clips with preliminary labels to the user device 130, the generation by the device 140 of the training data sets 310, 330, 350, and 370 from the labeled sound clips in the sound clips 160, and the training of the sound models 150 using the training data sets 310, 330, 350, and 370. The federating training manager 610 may operate in conjunction with the machine learning system 145 and may divide the operations performed in training the sound models 150 using the training data sets 650 into processing jobs.

The federating training manager 160 may distribute the processing jobs among the devices that are members of the environment-specific network for the environment 180, such as the devices 100, 110, 120, and 130. The devices 100, 110, 120, and 130 may include federated training clients 611, 612, 613, and 614. The federated training clients 611, 612, 613, and 614 may include any suitable combination of hardware and software, including versions of an application running on or built-in to an operating system of the devices 100, 110, 120, and 130. Each of the federated training clients 611, 612, 613, and 614 may have a different version of the application that may be designed to run on the computing hardware 103, 113, 123, and 133, respectively, based on, for example, on the computation resources available. The federated training clients 611, 612, 613, and 614 may communicate with the federated training manager 610, receiving processing jobs sent by the federated training manager 610, performing the necessary operation to complete the processing jobs using the computing hardware 103, 113, 123, and 133, and sending the results of the processing jobs back to the federated training manager 610. This may allow for computations used to train the sound models 150 to be distributed across devices in the environment 180 that may not have the computational resources to fully perform the training on their own. For example, a processing job may include operations for determining the value for a single cell of a hidden layer of one of the sound models 150, rather than determining all values for all layers, including hidden and output layers, allowing the processing job to be performed on a device with fewer computational resources than would be needed to perform all of the operations for all of the layers of a one of the sound models 150. The processing jobs may be performed in parallel by the devices 100, 110, 120, and 130. Processing jobs may be sent in a serial manner to individual devices, so that, for example, when the device 100 returns results from a first processing job to the federating training manager 610, the federating training manager 610 may send a second processing job to the device 100.

Figure 7:
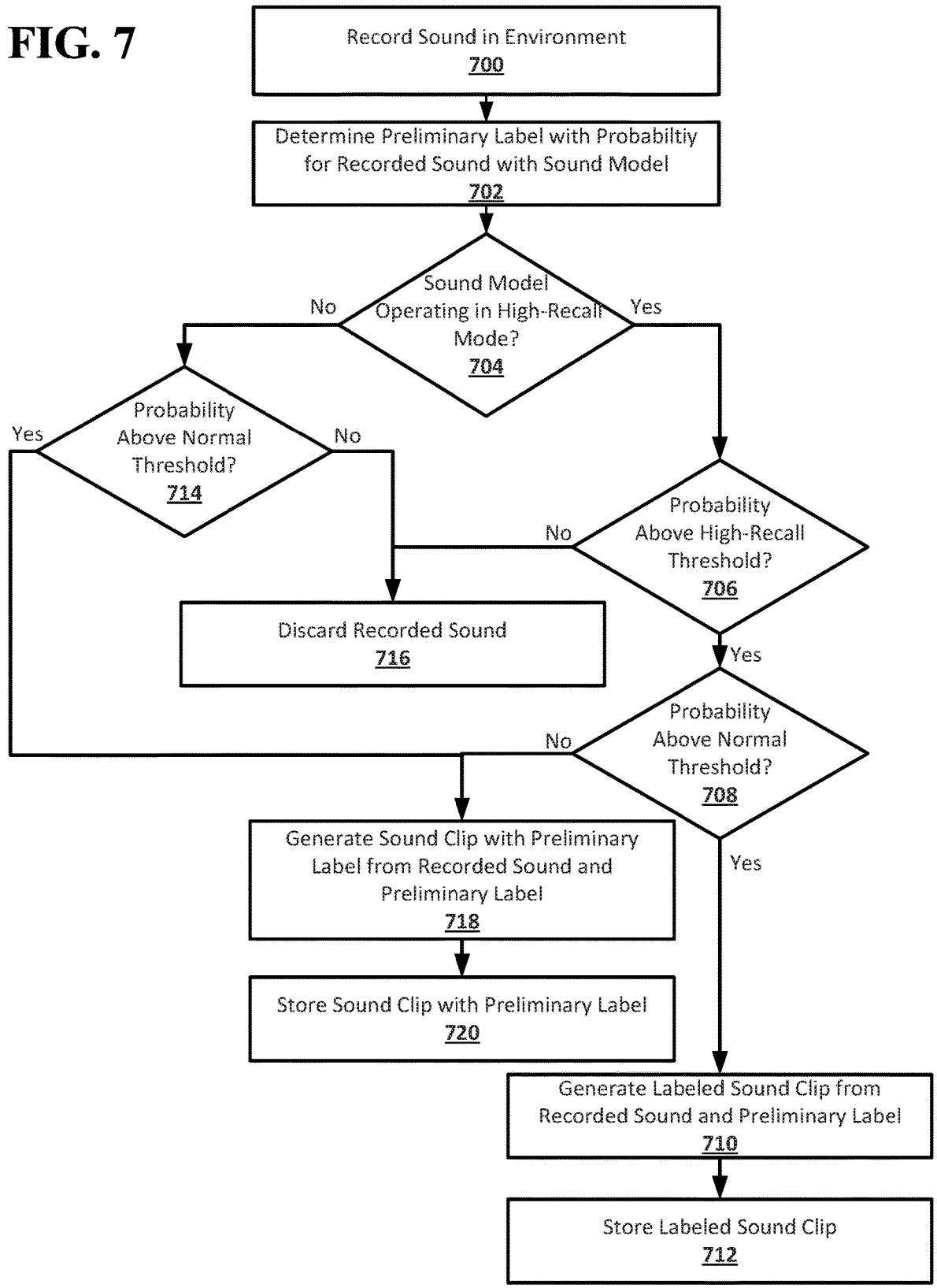
FIG. 7 shows an example process suitable for sound model localization within an environment according to an implementation of the disclosed subject matter.

FIG. 7 shows an example of a process suitable for sound model localization within an environment according to an implementation of the disclosed subject matter.

At 700, a sound may be recorded in an environment.

At 702, a preliminary label with a probability may be determined for the recorded sound with a sound model.

At 704, if the sound model is operating in high-recall mode, flow may proceed to 706. Otherwise, flow may proceed to 714.

At 706, if the probability is above the high-recall threshold, flow may proceed to 708. Otherwise, flow may proceed to 716.

At 708, if the probability is above the normal threshold, flow may proceed to 710. Otherwise, flow may proceed to 718.

At 710, a labeled sound clip may be generated from the recorded sound and the preliminary label.

At 712, the labeled sound clip may be stored.

At 714, if the probability is above the normal threshold, flow may proceed to 718. Otherwise, flow may proceed to 716.

At 716, the recorded sound may be discarded.

At 718, a sound clip with a preliminary label may be generated from the recorded sound and the preliminary label.

At 720, the sound clip with the preliminary label may be stored.

Figure 8:
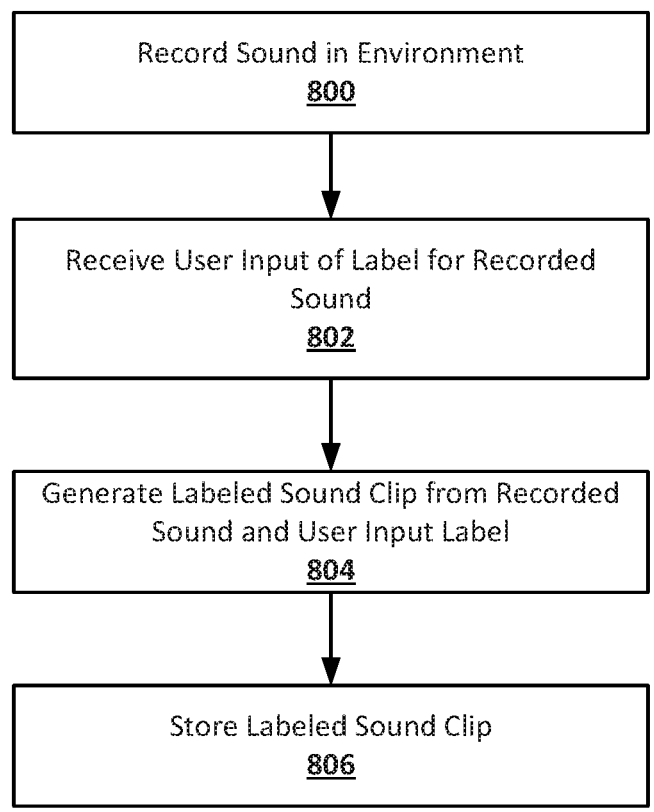
FIG. 8 shows an example process suitable for sound model localization within an environment according to an implementation of the disclosed subject matter.

FIG. 8 shows an example of a process suitable for sound model localization within an environment according to an implementation of the disclosed subject matter.

At 800, a sound may be recorded in an environment.

At 802, user input of a label for the recorded sound may be received.

At 804, a labeled sound clip may be generated from the recorded sound and the user input label.

At 806, the labeled sound clip may be stored.

Figure 9:
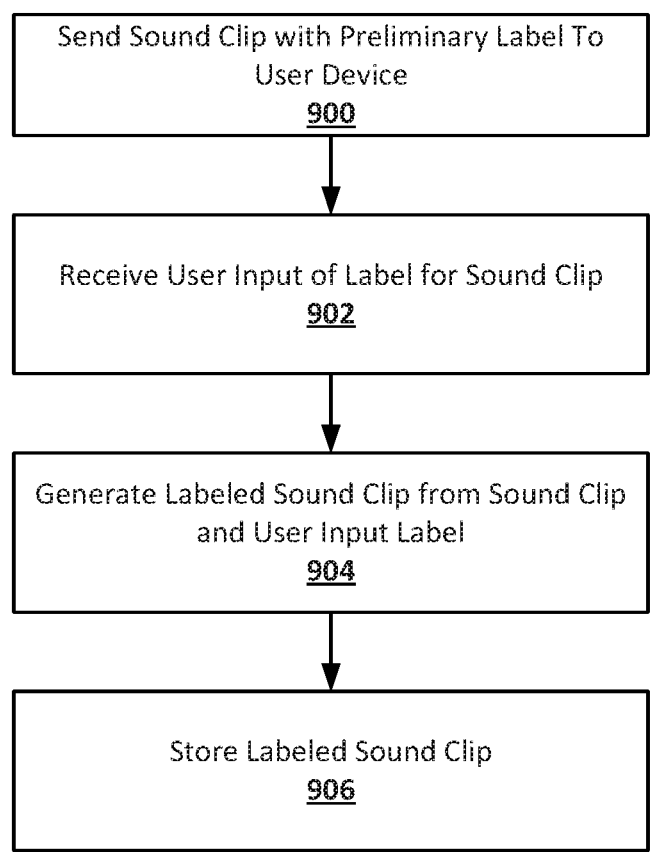
FIG. 9 shows an example process suitable for sound model localization within an environment according to an implementation of the disclosed subject matter.

FIG. 9 shows an example of a process suitable for sound model localization within an environment according to an implementation of the disclosed subject matter.

At 900, a sound clip with a preliminary label may be sent to a user device.

At 902, user input of a label for the sound clip may be received.

At 904, a labeled sound clip may be generated from the sound clip and the user input label.

At 906, the labeled sound clip may be stored.

Figure 10:
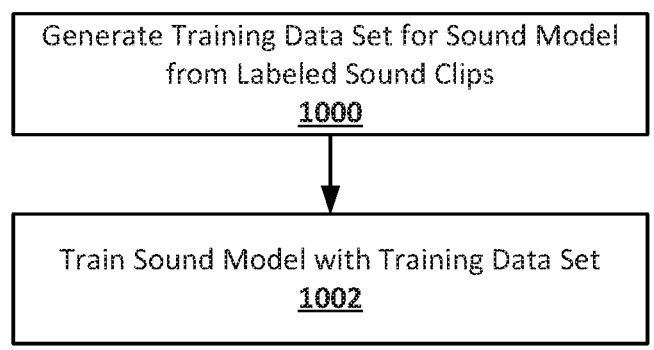
FIG. 10 shows an example process suitable for sound model localization within an environment according to an implementation of the disclosed subject matter.

FIG. 10 shows an example of a process suitable for sound model localization within an environment according to an implementation of the disclosed subject matter.

At 1000, a training data set for a sound model may be generated from labeled sound clips.

At 1002, the sound model may be trained with the training data set.

Figure 11:
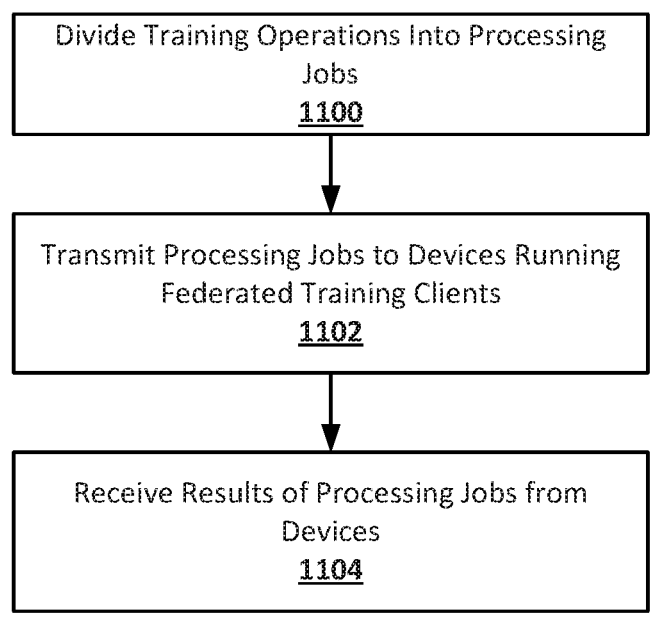
FIG. 11 shows an example process suitable for sound model localization within an environment according to an implementation of the disclosed subject matter.

FIG. 11 shows an example of a process suitable for sound model localization within an environment according to an implementation of the disclosed subject matter.

At 1100, a training operations may be divided into processing jobs.

At 1102, the processing jobs may be transmitted to devices running federated training clients.

At 1104, the results of the processing jobs may be received from the devices.

A computing device in an environment may receive, from devices in the environment, sound recordings made of sounds in the environment. The computing device may determine preliminary labels for the sound recordings using pre-trained sound models, wherein each of the preliminary labels has an associated probability. The computing device may generate sound clips with preliminary labels based on the sound recordings that have determined preliminary labels whose associated probability is over a high-recall threshold for the one of the pre-trained sound models that determined the preliminary label. The computing device may send the sound clips with preliminary labels to a user device. The computing device may receive labeled sound clips from the user device, wherein the labeled sound clips are based on the sound clips with preliminary labels. The computing device may generate training data sets for the pre-trained sound models using the labeled sound clips. The pre-trained sound models may be trained using the training data sets to generate localized sound models.

Additional labeled sound clips may be received from the user device based on sounds recorded in the environment using the user device, wherein the additional labeled sound clips are used in the generating of the training data sets.

Before sending the sound clips with preliminary labels to the user device, additional labeled sound clips may be generated based on the sound recordings that have determined preliminary labels whose associated probability is over a normal threshold for the one of the pre-trained sound models that determined the preliminary label, wherein the additional labeled sound clips are used in the generating of the training data sets.

The computing device may generate the training data sets for the pre-trained sound models using the labeled sound clips by adding labeled sound clips with labels that match a label of one of the pre-trained sound models to a training data set for the one of the pre-trained sound models as positive examples and adding labeled sound clips with labels that don't match the label of the one of the pre-trained sound models to the training data set for the one of the pre-trained sound models as negative examples.

The sound recordings made in the environment may be automatically recorded by ones of the devices in the environment that have microphones.

The computing device and devices may be members of an environment-specific network for the environment, and wherein the sound recordings, the sound clips with preliminary labels, labeled sound clips, and training data sets are only stored on devices that are members of the environment-specific network for the environment.

Training the pre-trained sound models using the training data sets to generate localized sound models may include dividing operations for training the pre-trained sound models into processing jobs, sending the processing jobs to the devices in the environment, and receiving results of the processing jobs from the devices in the environment.

A federated training manager may run on the computing device and perform the dividing of the operations for training the pre-trained sound models into processing jobs, the sending of the processing jobs to the devices in the environment, and the receiving of the results of the processing jobs from the devices in the environment, and versions of a federated training client may run on the devices in the environment and receive the processing jobs and send the results of the processing jobs to the federated training manager on the computing device.

Additional labeled sound clips may be generated by performing augmentations on the labeled sound clips.

A system may include a computing device in an environment that may receive, from devices in the environment, sound recordings made of sounds in the environment, determine preliminary labels for the sound recordings using pre-trained sound models, wherein each of the preliminary labels has an associated probability, generate sound clips with preliminary labels based on the sound recordings that have determined preliminary labels whose associated probability is over a high-recall threshold for the one of the pre-trained sound models that determined the preliminary label, send the sound clips with preliminary labels to a user device, receive labeled sound clips from the user device, wherein the labeled sound clips are based on the sound clips with preliminary labels, generate, by the computing device, training data sets for the pre-trained sound models using the labeled sound clips, and train the pre-trained sound models using the training data sets to generate localized sound models.

The computing device further may receive, from the user device, additional labeled sound clips based on sounds recorded in the environment using the user device, wherein the additional labeled sound clips are used to generate the training data sets.

The computing device may, before sending the sound clips with preliminary labels to the user device, generate additional labeled sound clips based on the sound recordings that have determined preliminary labels whose associated probability is over a normal threshold for the one of the pre-trained sound models that determined the preliminary label, wherein the additional labeled sound clips are used in the generating of the training data sets.

The computing device may generate training data sets for the pre-trained sound models using the labeled sound clips by adding labeled sound clips with labels that match a label of one of the pre-trained sound models to a training data set for the one of the pre-trained sound models as positive examples and add labeled sound clips with labels that don't match the label of the one of the pre-trained sound models to the training data set for the one of the pre-trained sound models as negative examples.

The computing device and devices are members of an environment-specific network for the environment, and wherein the sound recordings, the sound clips with preliminary labels, labeled sound clips, and training data sets are only stored on devices that are members of the environment-specific network for the environment.

The computing device may train the pre-trained sound models using the training data sets to generate localized sound models by dividing operations for training the pre-trained sound models into processing jobs, sending the processing jobs to the devices in the environment; and receiving results of the processing jobs from the devices in the environment.

The computing device may generate additional labeled sound clips by performing augmentations on the labeled sound clips.

According to an embodiment of the disclosed subject matter, a means for receiving, on a computing device in an environment, from devices in the environment, sound recordings made of sounds in the environment, a means for determining, by the computing device, preliminary labels for the sound recordings using pre-trained sound models, wherein each of the preliminary labels has an associated probability, a means for generating, by the computing device, sound clips with preliminary labels based on the sound recordings that have determined preliminary labels whose associated probability is over a high-recall threshold for the one of the pre-trained sound models that determined the preliminary label, a means for sending, by the computing device, the sound clips with preliminary labels to a user device, a means for receiving, by the computing device, labeled sound clips from the user device, wherein the labeled sound clips are based on the sound clips with preliminary labels, a means for generating, by the computing device, training data sets for the pre-trained sound models using the labeled sound clips, a means for training the pre-trained sound models using the training data sets to generate localized sound models, a means for receiving, from the user device, additional labeled sound clips based on sounds recorded in the environment using the user device, wherein the additional labeled sound clips are used in the generating of the training data sets, a means for adding labeled sound clips with labels that match a label of one of the pre-trained sound models to a training data set for the one of the pre-trained sound models as positive examples, a means for adding labeled sound clips with labels that don't match the label of the one of the pre-trained sound models to the training data set for the one of the pre-trained sound models as negative examples, a means for dividing operations for training the pre-trained sound models into processing jobs, a means for sending the processing jobs to the devices in the environment, a means for receiving results of the processing jobs from the devices in the environment, and a means for generating additional labeled sound clips by performing augmentations on the labeled sound clips, are included.

Embodiments disclosed herein may use one or more sensors. In general, a "sensor" may refer to any device that can obtain information about its environment. Sensors may be described by the type of information they collect. For example, sensor types as disclosed herein may include motion, smoke, carbon monoxide, proximity, temperature, time, physical orientation, acceleration, location, and the like. A sensor also may be described in terms of the particular physical device that obtains the environmental information. For example, an accelerometer may obtain acceleration information, and thus may be used as a general motion sensor and/or an acceleration sensor. A sensor also may be described in terms of the specific hardware components used to implement the sensor. For example, a temperature sensor may include a thermistor, thermocouple, resistance temperature detector, integrated circuit temperature detector, or combinations thereof. In some cases, a sensor may operate as multiple sensor types sequentially or concurrently, such as where a temperature sensor is used to detect a change in temperature, as well as the presence of a person or animal.

In general, a "sensor" as disclosed herein may include multiple sensors or sub-sensors, such as where a position sensor includes both a global positioning sensor (GPS) as well as a wireless network sensor, which provides data that can be correlated with known wireless networks to obtain location information. Multiple sensors may be arranged in a single physical housing, such as where a single device includes movement, temperature, magnetic, and/or other sensors. Such a housing also may be referred to as a sensor or a sensor device. For clarity, sensors are described with respect to the particular functions they perform and/or the particular physical hardware used, when such specification is necessary for understanding of the embodiments disclosed herein.

Figure 12:
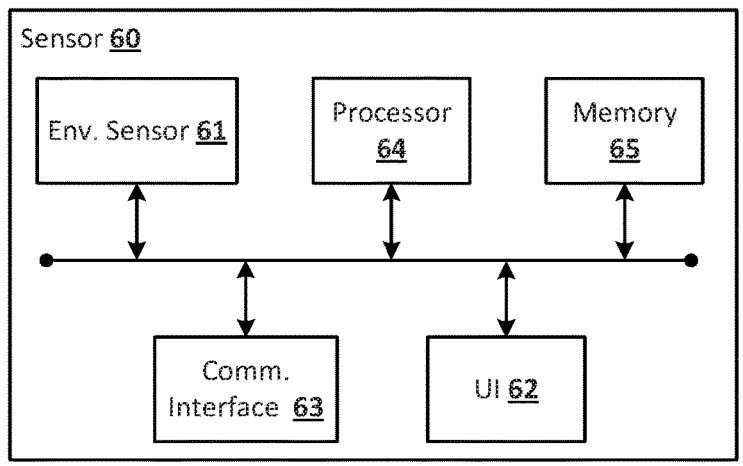
FIG. 12 shows a computing device according to an embodiment of the disclosed subject matter.

A sensor may include hardware in addition to the specific physical sensor that obtains information about the environment. FIG. 12 shows an example sensor as disclosed herein. The sensor 60 may include an environmental sensor 61, such as a temperature sensor, smoke sensor, carbon monoxide sensor, motion sensor, accelerometer, proximity sensor, passive infrared (PIR) sensor, magnetic field sensor, radio frequency (RF) sensor, light sensor, humidity sensor, or any other suitable environmental sensor, that obtains a corresponding type of information about the environment in which the sensor 60 is located. A processor 64 may receive and analyze data obtained by the sensor 61, control operation of other components of the sensor 60, and process communication between the sensor and other devices. The processor 64 may execute instructions stored on a computer-readable memory 65. The memory 65 or another memory in the sensor 60 may also store environmental data obtained by the sensor 61. A communication interface 63, such as a Wi-Fi or other wireless interface, Ethernet or other local network interface, or the like may allow for communication by the sensor 60 with other devices. A user interface (UI) 62 may provide information and/or receive input from a user of the sensor. The UI 62 may include, for example, a speaker to output an audible alarm when an event is detected by the sensor 60. Alternatively, or in addition, the UI 62 may include a light to be activated when an event is detected by the sensor 60. The user interface may be relatively minimal, such as a limited-output display, or it may be a full-featured interface such as a touchscreen. Components within the sensor 60 may transmit and receive information to and from one another via an internal bus or other mechanism as will be readily understood by one of skill in the art. One or more components may be implemented in a single physical arrangement, such as where multiple components are implemented on a single integrated circuit. Sensors as disclosed herein may include other components, and/or may not include all of the illustrative components shown.

Sensors as disclosed herein may operate within a communication network, such as a conventional wireless network, and/or a sensor-specific network through which sensors may communicate with one another and/or with dedicated other devices. In some configurations one or more sensors may provide information to one or more other sensors, to a central controller, or to any other device capable of communicating on a network with the one or more sensors. A central controller may be general- or special-purpose. For example, one type of central controller is a home automation network, that collects and analyzes data from one or more sensors within the home. Another example of a central controller is a special-purpose controller that is dedicated to a subset of functions, such as a security controller that collects and analyzes sensor data primarily or exclusively as it relates to various security considerations for a location. A central controller may be located locally with respect to the sensors with which it communicates and from which it obtains sensor data, such as in the case where it is positioned within a home that includes a home automation and/or sensor network. Alternatively or in addition, a central controller as disclosed herein may be remote from the sensors, such as where the central controller is implemented as a cloud-based system that communicates with multiple sensors, which may be located at multiple locations and may be local or remote with respect to one another.

Figure 13:
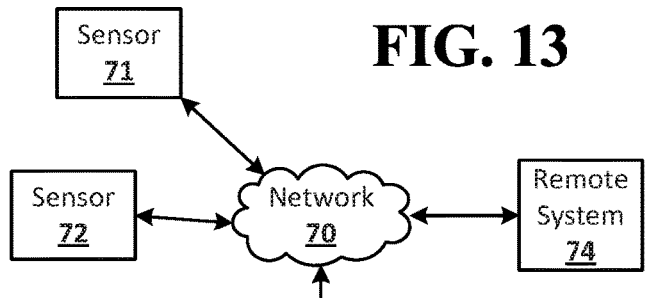
FIG. 13 shows a system according to an embodiment of the disclosed subject matter.

FIG. 13 shows an example of a sensor network as disclosed herein, which may be implemented over any suitable wired and/or wireless communication networks. One or more sensors 71, 72 may communicate via a local network 70, such as a Wi-Fi or other suitable network, with each other and/or with a controller 73. The controller may be a general- or special-purpose computer. The controller may, for example, receive, aggregate, and/or analyze environmental information received from the sensors 71, 72. The sensors 71, 72 and the controller 73 may be located locally to one another, such as within a single dwelling, office space, building, room, or the like, or they may be remote from each other, such as where the controller 73 is implemented in a remote system 74 such as a cloud-based reporting and/or analysis system. Alternatively or in addition, sensors may communicate directly with a remote system 74. The remote system 74 may, for example, aggregate data from multiple locations, provide instruction, software updates, and/or aggregated data to a controller 73 and/or sensors 71, 72.

For example, the hub computing device 155 may be an example of a controller 73 and the sensors 210 may be examples of sensors 71 and 72, as shown and described in further detail with respect to FIGS. 1-10.

The devices of the security system and home environment of the disclosed subject matter may be communicatively connected via the network 70, which may be a mesh-type network such as Thread, which provides network architecture and/or protocols for devices to communicate with one another. Typical home networks may have a single device point of communications. Such networks may be prone to failure, such that devices of the network cannot communicate with one another when the single device point does not operate normally. The mesh-type network of Thread, which may be used in the security system of the disclosed subject matter, may avoid communication using a single device. That is, in the mesh-type network, such as network 70, there is no single point of communication that may fail so as to prohibit devices coupled to the network from communicating with one another.

The communication and network protocols used by the devices communicatively coupled to the network 70 may provide secure communications, minimize the amount of power used (i.e., be power efficient), and support a wide variety of devices and/or products in a home, such as appliances, access control, climate control, energy management, lighting, safety, and security. For example, the protocols supported by the network and the devices connected thereto may have an open protocol which may carry IPv6 natively.

The Thread network, such as network 70, may be easy to set up and secure to use. The network 70 may use an authentication scheme, AES (Advanced Encryption Standard) encryption, or the like to reduce and/or minimize security holes that exist in other wireless protocols. The Thread network may be scalable to connect devices (e.g., 2, 5, 10, 20, 50, 100, 150, 200, or more devices) into a single network supporting multiple hops (e.g., so as to provide communications between devices when one or more nodes of the network is not operating normally). The network 70, which may be a Thread network, may provide security at the network and application layers. One or more devices communicatively coupled to the network 70 (e.g., controller 73, remote system 74, and the like) may store product install codes to ensure only authorized devices can join the network 70. One or more operations and communications of network 70 may use cryptography, such as public-key cryptography.

The devices communicatively coupled to the network 70 of the home environment and/or security system disclosed herein may low power consumption and/or reduced power consumption. That is, devices efficiently communicate to with one another and operate to provide functionality to the user, where the devices may have reduced battery size and increased battery lifetimes over conventional devices. The devices may include sleep modes to increase battery life and reduce power requirements. For example, communications between devices coupled to the network 70 may use the power-efficient IEEE 802.15.4 MAC/PHY protocol. In embodiments of the disclosed subject matter, short messaging between devices on the network 70 may conserve bandwidth and power. The routing protocol of the network 70 may reduce network overhead and latency. The communication interfaces of the devices coupled to the home environment may include wireless system-on-chips to support the low-power, secure, stable, and/or scalable communications network 70.

The sensor network shown in FIG. 13 may be an example of a home environment. The depicted home environment may include a structure, a house, office building, garage, mobile home, or the like. The devices of the environment, such as the sensors 71, 72, the controller 73, and the network 70 may be integrated into a home environment that does not include an entire structure, such as an apartment, condominium, or office space.

The environment can control and/or be coupled to devices outside of the structure. For example, one or more of the sensors 71, 72 may be located outside the structure, for example, at one or more distances from the structure (e.g., sensors 71, 72 may be disposed outside the structure, at points along a land perimeter on which the structure is located, and the like. One or more of the devices in the environment need not physically be within the structure. For example, the controller 73 which may receive input from the sensors 71, 72 may be located outside of the structure.

The structure of the home environment may include a plurality of rooms, separated at least partly from each other via walls. The walls can include interior walls or exterior walls. Each room can further include a floor and a ceiling. Devices of the home environment, such as the sensors 71, 72, may be mounted on, integrated with and/or supported by a wall, floor, or ceiling of the structure.

The home environment including the sensor network shown in FIG. 13 may include a plurality of devices, including intelligent, multi-sensing, network-connected devices that can integrate seamlessly with each other and/or with a central server or a cloud-computing system (e.g., controller 73 and/or remote system 74) to provide home-security and home features. The home environment may include one or more intelligent, multi-sensing, network-connected thermostats one or more intelligent, network-connected, multi-sensing hazard detection units and one or more intelligent, multi-sensing, network-connected entry-way interface devices. The hazard detectors, thermostats, and doorbells may be the sensors 71, 72 shown in FIG. 13.

According to embodiments of the disclosed subject matter, the thermostat may detect ambient climate characteristics (e.g., temperature and/or humidity) and may control an HVAC (heating, ventilating, and air conditioning) system accordingly of the structure. For example, the ambient client characteristics may be detected by sensors 71, 72 shown in FIG. 13, and the controller 73 may control the HVAC system (not shown) of the structure.

A hazard detector may detect the presence of a hazardous substance or a substance indicative of a hazardous substance (e.g., smoke, fire, or carbon monoxide). For example, smoke, fire, and/or carbon monoxide may be detected by sensors 71, 72 shown in FIG. 13, and the controller 73 may control an alarm system to provide a visual and/or audible alarm to the user of the home environment.

A doorbell may control doorbell functionality, detect a person's approach to or departure from a location (e.g., an outer door to the structure), and announce a person's approach or departure from the structure via audible and/or visual message that is output by a speaker and/or a display coupled to, for example, the controller 73.

In some embodiments, the home environment of the sensor network shown in FIG. 13 may include one or more intelligent, multi-sensing, network-connected wall switches, one or more intelligent, multi-sensing, network-connected wall plug. The wall switches and/or wall plugs may be the sensors 71, 72 shown in FIG. 13. The wall switches may detect ambient lighting conditions, and control a power and/or dim state of one or more lights. For example, the sensors 71, 72, may detect the ambient lighting conditions, and the controller 73 may control the power to one or more lights (not shown) in the home environment. The wall switches may also control a power state or speed of a fan, such as a ceiling fan. For example, sensors 72, 72 may detect the power and/or speed of a fan, and the controller 73 may adjusting the power and/or speed of the fan, accordingly. The wall plugs may control supply of power to one or more wall plugs (e.g., such that power is not supplied to the plug if nobody is detected to be within the home environment). For example, one of the wall plugs may controls supply of power to a lamp (not shown).

In embodiments of the disclosed subject matter, the home environment may include one or more intelligent, multi-sensing, network-connected entry detectors. The sensors 71, 72 shown in FIG. 13 may be the entry detectors. The illustrated entry detectors (e.g., sensors 71, 72) may be disposed at one or more windows, doors, and other entry points of the home environment for detecting when a window, door, or other entry point is opened, broken, breached, and/or compromised. The entry detectors may generate a corresponding signal to be provided to the controller 73 and/or the remote system 74 when a window or door is opened, closed, breached, and/or compromised. In some embodiments of the disclosed subject matter, the alarm system, which may be included with controller 73 and/or coupled to the network 70 may not arm unless all entry detectors (e.g., sensors 71, 72) indicate that all doors, windows, entryways, and the like are closed and/or that all entry detectors are armed.

The home environment of the sensor network shown in FIG. 13 can include one or more intelligent, multi-sensing, network-connected doorknobs. For example, the sensors 71, 72 may be coupled to a doorknob of a door (e.g., doorknobs 122 located on external doors of the structure of the home environment). However, it should be appreciated that doorknobs can be provided on external and/or internal doors of the home environment.

The thermostats, the hazard detectors, the doorbells, the wall switches, the wall plugs, the entry detectors, the doorknobs, the keypads, and other devices of the home environment (e.g., as illustrated as sensors 71, 72 of FIG. 13 can be communicatively coupled to each other via the network 70, and to the controller 73 and/or remote system 74 to provide security, safety, and/or comfort for the environment).

A user can interact with one or more of the network-connected devices (e.g., via the network 70). For example, a user can communicate with one or more of the network-connected devices using a computer (e.g., a desktop computer, laptop computer, tablet, or the like) or other portable electronic device (e.g., a phone, a tablet, a key FOB, and the like). A webpage or application can be configured to receive communications from the user and control the one or more of the network-connected devices based on the communications and/or to present information about the device's operation to the user. For example, the user can view can arm or disarm the security system of the home.

One or more users can control one or more of the network-connected devices in the home environment using a network-connected computer or portable electronic device. In some examples, some or all of the users (e.g., individuals who live in the home) can register their mobile device and/or key FOBs with the home environment (e.g., with the controller 73). Such registration can be made at a central server (e.g., the controller 73 and/or the remote system 74) to authenticate the user and/or the electronic device as being associated with the home environment, and to provide permission to the user to use the electronic device to control the network-connected devices and the security system of the home environment. A user can use their registered electronic device to remotely control the network-connected devices and security system of the home environment, such as when the occupant is at work or on vacation. The user may also use their registered electronic device to control the network-connected devices when the user is located inside the home environment.

Alternatively, or in addition to registering electronic devices, the home environment may make inferences about which individuals live in the home and are therefore users and which electronic devices are associated with those individuals. As such, the home environment "learns" who is a user (e.g., an authorized user) and permits the electronic devices associated with those individuals to control the network-connected devices of the home environment (e.g., devices communicatively coupled to the network 70). Various types of notices and other information may be provided to users via messages sent to one or more user electronic devices. For example, the messages can be sent via email, short message service (SMS), multimedia messaging service (MMS), unstructured supplementary service data (USSD), as well as any other type of messaging services and/or communication protocols.

The home environment may include communication with devices outside of the home environment but within a proximate geographical range of the home. For example, the home environment may include an outdoor lighting system (not shown) that communicates information through the communication network 70 or directly to a central server or cloud-computing system (e.g., controller 73 and/or remote system 74) regarding detected movement and/or presence of people, animals, and any other objects and receives back commands for controlling the lighting accordingly.

The controller 73 and/or remote system 74 can control the outdoor lighting system based on information received from the other network-connected devices in the home environment. For example, in the event, any of the network-connected devices, such as wall plugs located outdoors, detect movement at night time, the controller 73 and/or remote system 74 can activate the outdoor lighting system and/or other lights in the home environment.

Figure 16:
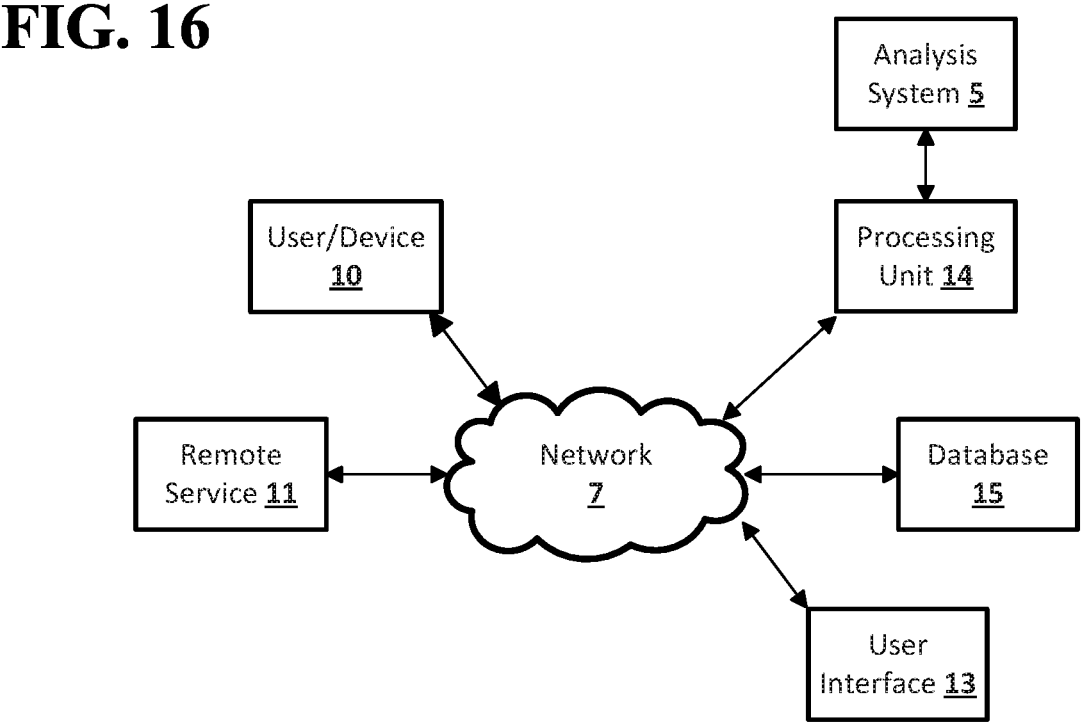
FIG. 16 shows a network configuration according to an embodiment of the disclosed subject matter.

In some configurations, a remote system 74 may aggregate data from multiple locations, such as multiple buildings, multi-resident buildings, individual residences within a neighborhood, multiple neighborhoods, and the like. In general, multiple sensor/controller systems 81, 82 as previously described with respect to FIG. 16 may provide information to the remote system 74. The systems 81, 82 may provide data directly from one or more sensors as previously described, or the data may be aggregated and/or analyzed by local controllers such as the controller 73, which then communicates with the remote system 74. The remote system may aggregate and analyze the data from multiple locations, and may provide aggregate results to each location. For example, the remote system 74 may examine larger regions for common sensor data or trends in sensor data, and provide information on the identified commonality or environmental data trends to each local system 81, 82.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. Thus, the user may have control over how information is collected about the user and used by a system as disclosed herein.

Figure 15:
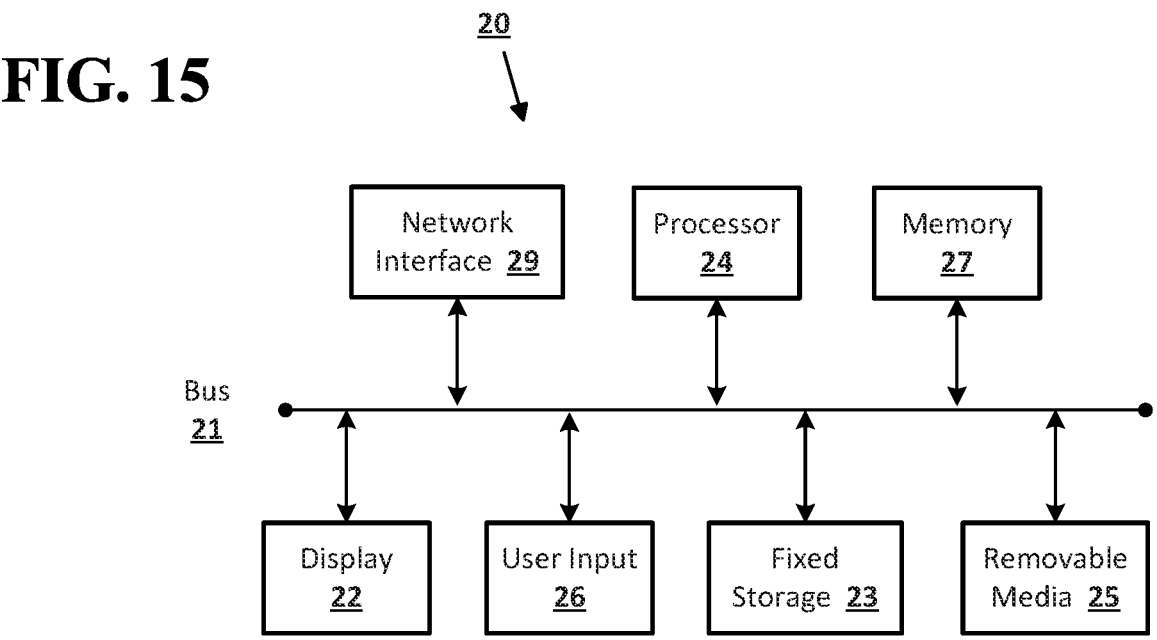
FIG. 15 shows a computer according to an embodiment of the disclosed subject matter.

Embodiments of the presently disclosed subject matter may be implemented in and used with a variety of computing devices. FIG. 15 is an example computing device 20 suitable for implementing embodiments of the presently disclosed subject matter. For example, the device 20 may be used to implement a controller, a device including sensors as disclosed herein, or the like. Alternatively or in addition, the device 20 may be, for example, a desktop or laptop computer, or a mobile computing device such as a phone, tablet, or the like. The device 20 may include a bus 21 which interconnects major components of the computer 20, such as a central processor 24, a memory 27 such as Random Access Memory (RAM), Read Only Memory (ROM), flash RAM, or the like, a user display 22 such as a display screen, a user input interface 26, which may include one or more controllers and associated user input devices such as a keyboard, mouse, touch screen, and the like, a fixed storage 23 such as a hard drive, flash storage, and the like, a removable media component 25 operative to control and receive an optical disk, flash drive, and the like, and a network interface 29 operable to communicate with one or more remote devices via a suitable network connection.

The bus 21 allows data communication between the central processor 24 and one or more memory components 25, 27, which may include RAM, ROM, and other memory, as previously noted. Applications resident with the computer 20 are generally stored on and accessed via a computer readable storage medium.

The fixed storage 23 may be integral with the computer 20 or may be separate and accessed through other interfaces. The network interface 29 may provide a direct connection to a remote server via a wired or wireless connection. The network interface 29 may provide such connection using any suitable technique and protocol as will be readily understood by one of skill in the art, including digital cellular telephone, WiFi, Bluetooth®, near-field, and the like. For example, the network interface 29 may allow the device to communicate with other computers via one or more local, wide-area, or other communication networks, as described in further detail herein.

Figure 14:
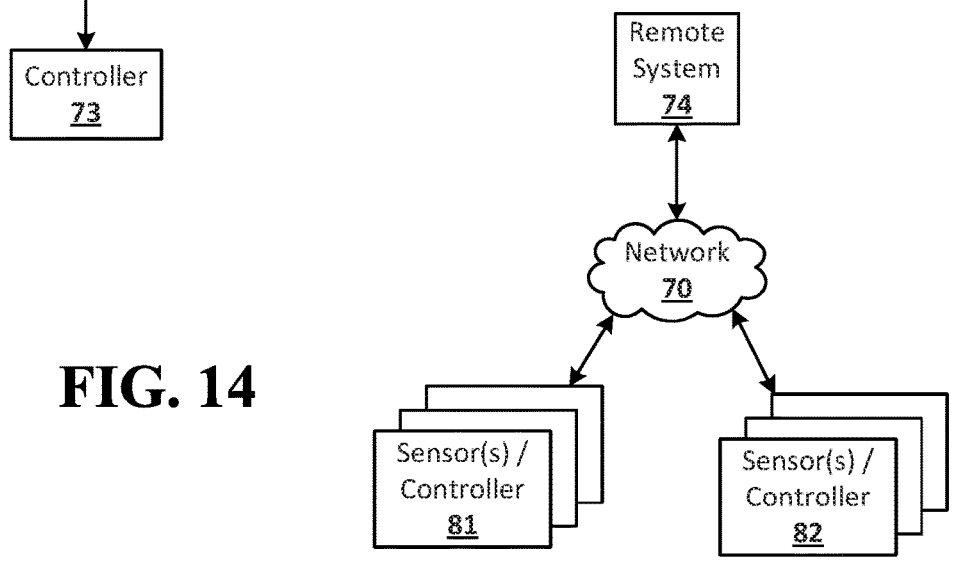
FIG. 14 shows a system according to an embodiment of the disclosed subject matter.

FIG. 14 shows an example network arrangement according to an embodiment of the disclosed subject matter. One or more clients 10, 11, such as local computers, phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15. One or more processing units 14 may be, for example, part of a distributed system such as a cloud-based computing system, search engine, content delivery system, or the like, which may also include or communicate with a database 15 and/or user interface 13. In some arrangements, an analysis system 5 may provide back-end processing, such as where stored or acquired data is pre-processed by the analysis system 5 before delivery to the processing unit 14, database 15, and/or user interface 13.

Various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as hard drives, USB (universal serial bus) drives, or any other machine readable storage medium, such that when the computer program code is loaded into and executed by a computer, the computer becomes an apparatus for practicing embodiments of the disclosed subject matter. When implemented on a general-purpose microprocessor, the computer program code may configure the microprocessor to become a special-purpose device, such as by creation of specific logic circuits as specified by the instructions.

Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A computer-implemented method performed by a data processing apparatus, the method comprising:
   receiving, on a computing device in an environment, from devices in the environment, sound recordings made of sounds in the environment;
   determining, by the computing device, preliminary labels for the sound recordings using pre-trained sound models, wherein each of the preliminary labels has an associated probability;
   generating, by the computing device, sound clips with preliminary labels based on the sound recordings that have determined preliminary labels whose associated probability is over a high-recall threshold for the one of the pre-trained sound models that determined the preliminary label;
   sending, by the computing device, the sound clips with preliminary labels to a user device;
   presenting, by the user device, the sounds clips with the preliminary labels, wherein:
      a first sound clip is selected by a user as matching its preliminary label; and
      a second sound clip is provided a second label, differing from its preliminary label, by the user;
   receiving, by the computing device, labels for the sound clips from the user device, wherein:
      a first label for the first sound clip matches its preliminary label; and
      the second label for the second sound clip differs from its preliminary label;
   generating, by the computing device, training data sets for the pre-trained sound models using the labeled sound clips; and
   training the pre-trained sound models using the training data sets to generate localized sound models.

2. The method of claim 1, further comprising:
   receiving, from the user device, additional labeled sound clips based on sounds recorded in the environment using the user device, wherein the additional labeled sound clips are used in the generating of the training data sets.

3. The method of claim 1, further comprising, before sending the sound clips with preliminary labels to the user device, generating additional labeled sound clips based on the sound recordings that have determined preliminary labels whose associated probability is over a normal threshold for the one of the pre-trained sound models that determined the preliminary label, wherein the additional labeled sound clips are used in the generating of the training data sets.

4. The method of claim 1, wherein generating, by the computing device, training data sets for the pre-trained sound models using the labeled sound clips further comprises:
   adding labeled sound clips with labels that match a label of one of the pre-trained sound models to a training data set for the one of the pre-trained sound models as positive examples; and
   adding labeled sound clips with labels that don't match the label of the one of the pre-trained sound models to the training data set for the one of the pre-trained sound models as negative examples.

5. The method of claim 1, wherein the sound recordings made in the environment are automatically recorded by ones of the devices in the environment that have microphones.

6. The method of claim 1, wherein the computing device and devices are members of an environment-specific network for the environment, and wherein the sound recordings, the sound clips with preliminary labels, labeled sound clips, and training data sets are only stored on devices that are members of the environment-specific network for the environment.

7. The method of claim 1, wherein training the pre-trained sound models using the training data sets to generate localized sound models further comprises:
   dividing operations for training the pre-trained sound models into processing jobs;
   sending the processing jobs to the devices in the environment; and
   receiving results of the processing jobs from the devices in the environment.

8. The method of claim 7, wherein a federated training manager runs on the computing device and performs the dividing of the operations for training the pre-trained sound models into processing jobs, the sending of the processing jobs to the devices in the environment, and the receiving of the results of the processing jobs from the devices in the environment, and wherein versions of a federated training client run on the devices in the environment and receive the processing jobs and send the results of the processing jobs to the federated training manager on the computing device.

9. The method of claim 1, further comprising generating additional labeled sound clips by performing augmentations on the labeled sound clips.

10. A computer-implemented system for sound model localization within an environment comprising:
    a computing device in an environment that:
       receives, from devices in the environment, sound recordings made of sounds in the environment, determines preliminary labels for the sound recordings using pre-trained sound models, wherein
each of the preliminary labels has an associated probability, generates sound clips with preliminary labels based on the sound recordings that have determined preliminary labels whose associated probability is over a high-recall threshold for the one of the pre-trained sound models that determined the preliminary label,
sends the sound clips with preliminary labels to a user device,
receives labels for the sound clips from the user device, wherein
a first label for a first sound clip matches its preliminary label; and
a second label for a second sound clip differs from its preliminary label based on user input;
generates, by the computing device, training data sets for the pre-trained sound models using the labeled sound clips, and
trains the pre-trained sound models using the training data sets to generate localized sound models.

11. The computer-implemented system of claim 10, wherein the computing device further receives from the user device, additional labeled sound clips based on sounds recorded in the environment using the user device, wherein the additional labeled sound clips are used to generate of the training data sets.

12. The computer-implemented system of claim 10, wherein the computing device, before sending the sound clips with preliminary labels to the user device, generates additional labeled sound clips based on the sound recordings that have determined preliminary labels whose associated probability is over a normal threshold for the one of the pre-trained sound models that determined the preliminary label, wherein the additional labeled sound clips are used to generate of the training data sets.

13. The computer-implemented system of claim 10, wherein the computing devices generates training data sets for the pre-trained sound models using the labeled sound clips by adding labeled sound clips with labels that match a label of one of the pre-trained sound models to a training data set for the one of the pre-trained sound models as positive examples; and
adding labeled sound clips with labels that don't match the label of the one of the pre-trained sound models to the training data set for the one of the pre-trained sound models as negative examples.

14. The computer-implemented system of claim 10, wherein the sound recordings made in the environment are automatically recorded by ones of the devices in the environment that have microphones.

15. The computer-implemented system of claim 10, wherein the computing device and devices are members of an environment-specific network for the environment, and wherein the sound recordings, the sound clips with preliminary labels, labeled sound clips, and training data sets are only stored on devices that are members of the environment-specific network for the environment.

16. The computer-implemented system of claim 10, wherein the computing device trains the pre-trained sound models using the training data sets to generate localized sound models by dividing operations for training the pre-trained sound models into processing jobs, sending the processing jobs to the devices in the environment; and receiving results of the processing jobs from the devices in the environment.

17. The computer-implemented system of claim 16, wherein a federated training manager runs on the computing device and performs the dividing of the operations for training the pre-trained sound models into processing jobs, the sending of the processing jobs to the devices in the environment, and the receiving of the results of the processing jobs from the devices in the environment, and wherein versions of a federated training client run on the devices in the environment and receive the processing jobs and send the results of the processing jobs to the federated training manager on the computing device.

18. The computer-implemented system of claim 10, further wherein the computing device generates additional labeled sound clips by performing augmentations on the labeled sound clips.

19. A system comprising:
an application executed on a user device; and
one or more computers and one or more storage devices storing instructions which are operable, when executed by the one or more computers, to cause the one or more computers to perform operations comprising:
receiving, on a computing device in an environment, from devices in the environment, sound recordings made of sounds in the environment;
determining, by the computing device, preliminary labels for the sound recordings using pre-trained sound models, wherein each of the preliminary labels has an associated probability;
generating, by the computing device, sound clips with preliminary labels based on the sound recordings that have determined preliminary labels whose associated probability is over a high-recall threshold for the one of the pre-trained sound models that determined the preliminary label;
sending, by the computing device, the sound clips with preliminary labels to the user device, wherein:
the user device presents the sounds clips with the preliminary labels, wherein:
a first sound clip is selected by a user as matching its preliminary label; and
a second sound clip is provided a second label, differing from its preliminary label, by the user;
receiving, by the computing device, labels for the sound clips from the user device, wherein:
a first label for the first sound clip matches its preliminary label; and
the second label for the second sound clip differs from its preliminary label;
generating, by the computing device, training data sets for the pre-trained sound models using the labeled sound clips; and
training the pre-trained sound models using the training data sets to generate localized sound models.

20. The system of claim 19, wherein the instructions further cause the one or more computers to perform operations comprising receiving, from the user device, additional labeled sound clips based on sounds recorded in the environment using the user device, wherein the additional labeled sound clips are used in the generating of the training data sets.

* * * * *